United States Patent
Bang et al.

(10) Patent No.: US 12,402,124 B2
(45) Date of Patent: Aug. 26, 2025

(54) METHOD AND APPARATUS FOR DETERMINING CHANNEL ACCESS PROCEDURE IN WIRELESS COMMUNICATION SYSTEM

(71) Applicant: SAMSUNG ELECTRONICS CO., LTD., Suwon-si (KR)

(72) Inventors: Jonghyun Bang, Suwon-si (KR); Younsun Kim, Suwon-si (KR); Hyunseok Ryu, Suwon-si (KR); Sungjin Park, Suwon-si (KR); Jeongho Yeo, Suwon-si (KR); Cheolkyu Shin, Suwon-si (KR); Jinyoung Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 313 days.

(21) Appl. No.: 17/907,376

(22) PCT Filed: Mar. 22, 2021

(86) PCT No.: PCT/KR2021/003493
§ 371 (c)(1),
(2) Date: Sep. 26, 2022

(87) PCT Pub. No.: WO2021/194185
PCT Pub. Date: Sep. 30, 2021

(65) Prior Publication Data
US 2023/0122786 A1    Apr. 20, 2023

(30) Foreign Application Priority Data
Mar. 27, 2020   (KR) ........................ 10-2020-0037263

(51) Int. Cl.
*H04W 72/1268*   (2023.01)
*H04W 16/28*     (2009.01)
(Continued)

(52) U.S. Cl.
CPC ....... *H04W 72/1268* (2013.01); *H04W 16/28* (2013.01); *H04W 72/23* (2023.01); *H04W 74/0808* (2013.01)

(58) Field of Classification Search
CPC . H04W 72/1268; H04W 16/28; H04W 72/23; H04W 74/0808; H04W 72/232;
(Continued)

(56) References Cited

U.S. PATENT DOCUMENTS 10,856,328 B2   12/2020  Um et al.
11,375,540 B2    6/2022  Yang et al.
(Continued)

FOREIGN PATENT DOCUMENTS

CN   107888256 A   4/2018
CN   108352975 A   7/2018
(Continued)

OTHER PUBLICATIONS

International Search Report and Written Opinion of the International Searching Authority dated Jun. 25, 2021, in connection with International Application No. PCT/KR2021/003493, 9 pages.

(Continued)

*Primary Examiner* — Kiet Tang

(57) ABSTRACT

The present invention relates to a method and a device for a channel access procedure in a wireless communication system. More specifically, the present invention relates to a method for performing a channel access procedure by a base station in a specific direction (or beam) in an unlicensed band. More specifically, the present invention proposes a method for configuring and generating downlink control information by a base station in order to transmit, to a terminal, a result of a channel access procedure performed in a specific direction, and a method for determining the information by the terminal. A method of a terminal in a (Continued)

communication system according to an embodiment of the present disclosure may comprise the steps of: receiving, from a base station, downlink control information (DCI) for scheduling of uplink signal transmission; checking beam-related information which is included in the DCI and indicates a beam for the uplink signal transmission; and performing the uplink signal transmission to the base station without a channel access procedure of the terminal on the basis of the beam indicated by the beam-related information.

12 Claims, 17 Drawing Sheets

(51) Int. Cl.
*H04W 72/23* (2023.01)
*H04W 74/0808* (2024.01)

(58) Field of Classification Search
CPC .............. H04W 72/046; H04W 74/002; H04B 7/06952; H04B 7/088
See application file for complete search history.

(56) References Cited

U.S. PATENT DOCUMENTS

| | | | |
|---|---|---|---|
| 2017/0359826 A1* | 12/2017 | Islam | H04W 72/542 |
| 2018/0317256 A1* | 11/2018 | Um | H04W 16/14 |
| 2019/0052320 A1* | 2/2019 | Yu | H04W 72/046 |
| 2019/0104514 A1* | 4/2019 | Chendamarai Kannan | H04L 1/00 |
| 2019/0141693 A1 | 5/2019 | Guo et al. | |
| 2019/0160741 A1 | 5/2019 | Weaver et al. | |
| 2019/0246411 A1* | 8/2019 | Kim | H04W 74/00 |
| 2019/0373635 A1 | 12/2019 | Yang et al. | |
| 2020/0275482 A1 | 8/2020 | Oh et al. | |
| 2021/0022015 A1 | 1/2021 | Oh et al. | |
| 2021/0045156 A1 | 2/2021 | Zhang et al. | |
| 2021/0298072 A1 | 9/2021 | Oh et al. | |

FOREIGN PATENT DOCUMENTS

| | | |
|---|---|---|
| KR | 10-2019-0094389 A | 8/2019 |
| KR | 10-2019-0129388 A | 11/2019 |
| KR | 10-2020-0018142 A | 2/2020 |
| KR | 10-2020-0102874 A | 9/2020 |
| WO | 2019160741 A1 | 8/2019 |
| WO | 2019/206108 A1 | 10/2019 |

OTHER PUBLICATIONS

Notification of the First Office Action dated May 15, 2025, in connection with Chinese Application No. 202180024478.6, 19 pages.

* cited by examiner

METHOD AND APPARATUS FOR DETERMINING CHANNEL ACCESS PROCEDURE IN WIRELESS COMMUNICATION SYSTEM

CROSS-REFERENCE TO RELATED APPLICATIONS

This application is a 371 of International Application No. PCT/KR2021/003493 filed on Mar. 22, 2021, which claims priority to Korean Patent Application No. 10-2020-0037263 filed Mar. 27, 2020, the disclosures of which are herein incorporated by reference in their entirety.

BACKGROUND

1. Field

The disclosure relates to a wireless communication system and, more particularly, to a method and apparatus for determining a channel access procedure in a wireless communication system. More specifically, the disclosure relates to a method of including, in control information, the results of a channel access procedure which is performed by a system or a node that transmits a downlink signal or a system or a node that transmits an uplink signal, transmitting the control information, and determining and interpreting received control information, in a wireless communication system, in particular, in an unlicensed band.

2. Description of Related Art

In order to satisfy wireless data traffic demands that explosively tend to increase due to the commercialization of the 4G communication system and an increase in multimedia services, an enhanced 5G communication system or a pre-5G communication system are being developed. For this reason, the 5G communication system or the pre-5G communication system is called a beyond 4G network communication system or a post LTE system.

In order to achieve a data transfer rate, an implementation of a 5G communication system in a mmWave band (e.g., a 60 Giga (60 GHz) band) is taken into consideration. In order to reduce a path loss of a radio wave and increase the transfer distance of a radio wave in the mmWave band, beamforming, massive MIMO, full dimensional MIMO (FD-MIMO), array antenna, analog beamforming, and large scale antenna technologies have been discussed in the 5G communication system.

Furthermore, in order to improve the network of a system, technologies, such as an improved small cell, an advanced small cell, a cloud radio access network (cloud RAN), an ultra-dense network, device to device communication (D2D), wireless backhaul, a moving network, cooperative communication, coordinated multi-points (CoMP), and reception interference cancellation, are being developed in the 5G communication system. In addition, hybrid FSK and QAM modulation (FQAM) and sliding window superposition coding (SWSC) that are advanced coding modulation (ACM) methods, and filter bank multi-carrier (FBMC), non-orthogonal multiple access (NOMA) and sparse code multiple access (SCMA), that is, advanced access technologies, are being developed in the 5G system.

Meanwhile, the Internet evolves from a human-centered connection network over which human generates and consumes information to Internet of things (IoT) through which information is exchanged and processed between distributed elements, such as things. An Internet of everything (IoE) technology in which a big data processing technology through a connection with a cloud server is combined with the IoT technology is emerging. In order to implement the IoT, technical elements, such as the sensing technology, wired/wireless communication and network infrastructure, service interface technology and security technology, are required. Accordingly, technologies, such as a sensor network, machine to machine (M2M) and machine type communication (MTC) for a connection between things, are recently researched. In the IoT environment, an intelligent Internet technology (IT) service in which a new value is created for human life by collecting and analyzing data generated from connected things may be provided. The IoT may be applied to fields, such as a smart home, a smart building, a smart city, a smart car or a connected car, a smart grid, health care, smart home appliances, and advanced medical services, through convergence and composition between the existing information technology (IT) and various industries.

Accordingly, various attempts to apply a 5G communication system to the IoT network are being made. For example, 5G communication technologies, such as a sensor network, machine to machine (M2M), and machine type communication (MTC), are implemented by beamforming, MIMO, an array antenna, etc. The application of the cloud RAN as the aforementioned big data processing technology may be said to be an example of the convergence of the 5G technology and the IoT technology.

The disclosure relates to a method and apparatus for determining a channel access procedure in a wireless communication system. An embodiment of the disclosure presents a method of performing and determining, by a system or a node that transmits a downlink signal through an unlicensed band, a channel access procedure and including the results of the execution and determination in downlink control information. Another embodiment of the disclosure presents a method of determining, by a system or a node that transmits an uplink signal, a channel access procedure based on received downlink control information.

SUMMARY

A method of a terminal of a communication system according to an embodiment of the disclosure for solving the aforementioned problems may include receiving, from a base station, downlink control information (DCI) scheduling the transmission of an uplink signal, identifying beam-related information indicative of a beam for the transmission of the uplink signal included in the DCI, and transmitting the uplink signal to the base station without a channel access procedure of the UE based on the beam indicated by the beam-related information.

According to an embodiment, the beam-related information may be determined based on a channel access procedure of the base station for each of at least one beam.

According to an embodiment, the channel access procedure of the base station for each of the at least one beam may be performed based on an arbitrary integer value selected for each of the at least one beam within a contention window.

According to an embodiment, based on the beam-related information being not included in the DCI, the uplink signal may be transmitted to the base station based on a channel access procedure performed by the UE.

A method of a base station of a communication system according to an embodiment of the disclosure may include identifying beam-related information indicative of a beam for the transmission of an uplink signal of a user equipment (UE), transmitting, to the UE, downlink control information (DCI) including the beam-related information and scheduling the transmission of the uplink signal, and receiving, from the UE, the uplink signal transmitted without a channel access procedure of the UE based on the beam indicated by the beam-related information.

A user equipment (UE) of a communication system according to an embodiment of the disclosure may include a transceiver unit, and a controller configured to receive, from a base station, downlink control information (DCI) scheduling the transmission of an uplink signal, identify beam-related information indicative of a beam for the transmission of the uplink signal included in the DCI, and transmit the uplink signal to the base station without a channel access procedure of the UE based on the beam indicated by the beam-related information.

A base station of a communication system according to an embodiment of the disclosure may include a transceiver unit, and a controller configured to identify beam-related information indicative of a beam for the transmission of an uplink signal of a user equipment (UE), transmit, to the UE, downlink control information (DCI) including the beam-related information and scheduling the transmission of the uplink signal, and receive, from the UE, the uplink signal transmitted without a channel access procedure of the UE based on the beam indicated by the beam-related information.

According to an embodiment of the present disclosure, uplink data transmission efficiency can be improved through the method of determining, by a system or a node that receives a downlink signal or a system or a node that transmits an uplink signal, control information included in a downlink control channel in a wireless communication system.

DETAILED DESCRIPTION

Figure 1:
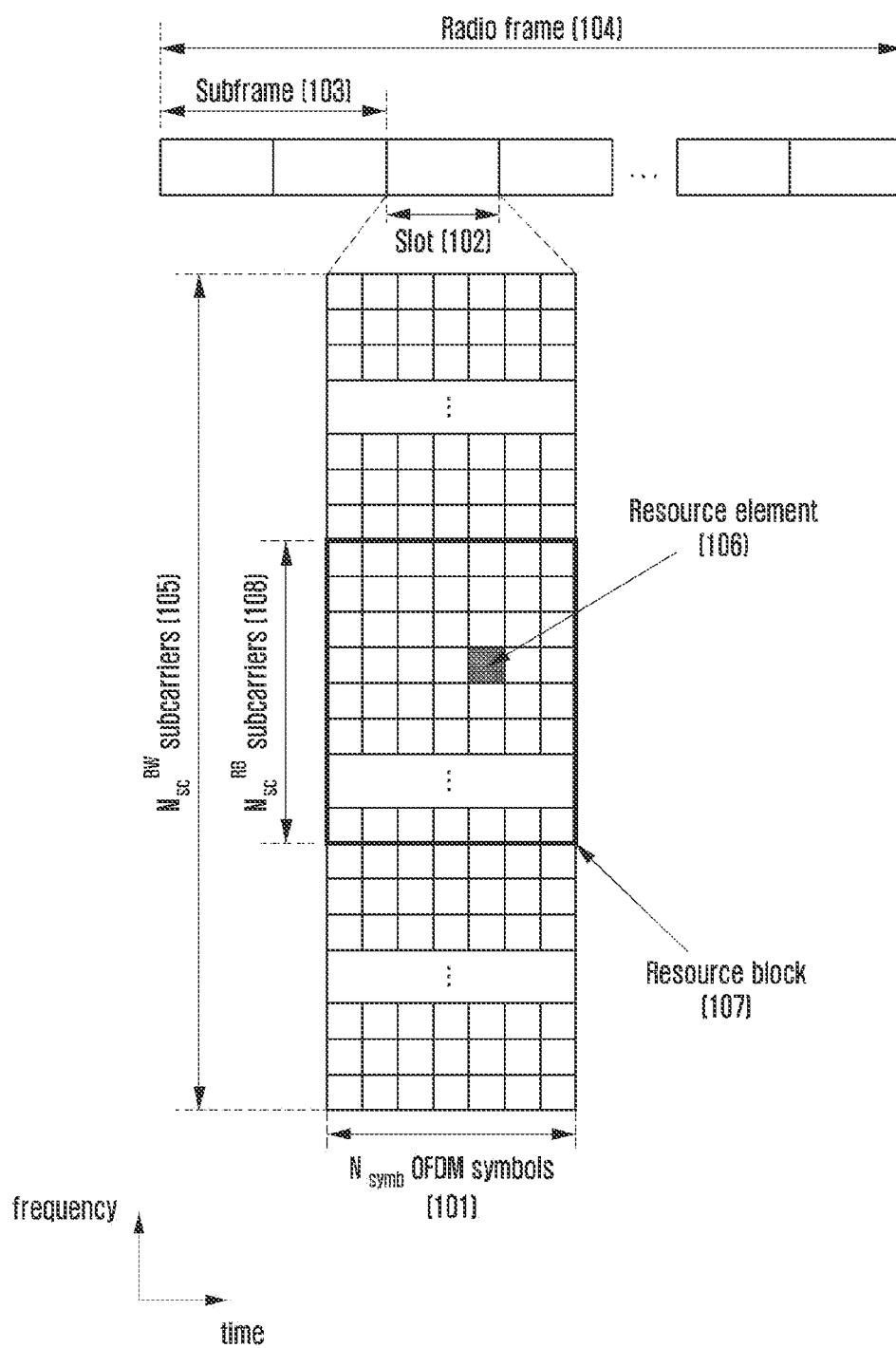
FIG. 1 is a diagram illustrating a basic structure of a time-frequency region, that is, a radio resource region in which data or a control channel is transmitted in the uplink/downlink of an NR system or a system similar thereto according to an embodiment of the disclosure.

Hereinafter, embodiments of the present disclosure are described in detail with reference to the accompanying drawings. Furthermore, in describing the present disclosure, a detailed description of a related known function or configuration will be omitted if it is deemed to make the subject matter of the present disclosure unnecessarily vague. Furthermore, terms to be described hereinafter have been defined by taking into consideration functions in the present disclosure, and may be different depending on a user, an operator's intention or practice. Accordingly, each term should be defined based on contents over the entire specification.

Advantages and characteristics of the disclosure and a method for achieving the advantages and characteristics will become apparent from the embodiments described in detail later in conjunction with the accompanying drawings. However, the disclosure is not limited to the disclosed embodiments, but may be implemented in various different forms. The embodiments are merely provided to complete the disclosure and to fully notify a person having ordinary knowledge in the art to which the disclosure pertains of the category of the disclosure. The disclosure is defined by the category of the claims. Throughout the specification, the same reference numerals denote the same elements.

Hereinafter, embodiments of the disclosure are described in detail with reference to the accompanying drawings.

In describing the embodiments, a description of technology contents that are well known in the art to which the disclosure pertains and that are not directly related to the disclosure is omitted in order to clearly deliver the subject matter of the disclosure without obscuring the subject matter of the disclosure by omitting an unnecessary description.

For the same reason, in the accompanying drawings, some elements are enlarged, omitted or schematically depicted. Furthermore, the size of each element does not accurately reflect its real size. In the drawings, the same or similar elements are assigned the same reference numerals.

Advantages and characteristics of the disclosure and a method for achieving the advantages and characteristics will become apparent from the embodiments described in detail later in conjunction with the accompanying drawings. However, the disclosure is not limited to the disclosed embodiments, but may be implemented in various different forms. The embodiments are merely provided to complete the disclosure and to fully notify a person having ordinary knowledge in the art to which the disclosure pertains of the category of the disclosure. The disclosure is defined by the category of the claims. Throughout the specification, the same reference numerals denote the same elements.

In the disclosure, it will be understood that each block of the flowchart illustrations and combinations of the blocks in the flowchart illustrations can be executed by computer program instructions. These computer program instructions may be mounted on the processor of a general purpose computer, a special purpose computer, or other programmable data processing equipment, so that the instructions executed by the processor of the computer or other programmable data processing equipment create means for executing the functions specified in the flowchart block(s). These computer program instructions may also be stored in a computer-usable or computer-readable memory that can direct a computer or other programmable data processing equipment to implement a function in a particular manner, such that the instructions stored in the computer-usable or computer-readable memory produce an article of manufacture including instruction means that implement the function specified in the flowchart block(s). The computer program instructions may also be loaded on a computer or other programmable data processing equipment to cause a series of operational steps to be performed on the computer or other programmable data processing equipment to produce a computer-executed process, so that the instructions performing the computer or programmable data processing equipment provide steps for executing the functions described in the flowchart block(s).

Furthermore, each block of the flowcharts may represent a portion of a module, a segment, or code, which includes one or more executable instructions for executing a specified logical function(s). It should also be noted that in some alternative implementations, the functions noted in the blocks may occur out of order. For example, two blocks shown in succession may in fact be executed substantially concurrently, or the blocks may sometimes be executed in the reverse order, depending upon the functionality involved.

In this case, the term "unit", as used in the present embodiment means software or a hardware component, such as an FPGA or an ASIC, and the "unit" performs specific tasks. However, the term "~unit" does not mean that it is limited to software or hardware. The "unit" may advantageously be configured to reside on an addressable storage medium and configured to operate on one or more processors. Accordingly, the "unit" may include, for example, components, such as software components, object-oriented software components, class components, and task components, processes, functions, attributes, procedures, sub-routines, segments of program code, drivers, firmware, microcode, circuitry, data, databases, data structures, tables, arrays, and variables. The functionalities provided in the components and "units" may be combined into fewer components and "units" or may be further separated into additional components and "units". Furthermore, the components and "units" may be implemented to operate on one or more CPUs within a device or a security multimedia card. Furthermore, in an embodiment, the "~ unit" may include one or more processors.

In a 5G system, the support of various services compared to the existing 4G system is taken into consideration. For example, the most representative services may include enhanced mobile broad band (eMBB), ultra-reliable and low latency communication (URLLC), massive machine type communication (mMTC), an evolved multimedia broadcast/multicast service (eMBMS), etc. Furthermore, a system that provides the URLLC service may be referred to as a URLLC system, a system that provides the eMBB service may be referred to as an eMBB system, etc. Furthermore, the terms "service" and "system" may be interchangeably used.

As described above, in a communication system, a plurality of services may be provided to a user. In order to provide a user with a plurality of such services, there is a need for a method capable of providing each service within the same time interval according to characteristics of each service and an apparatus using the same.

Meanwhile, in a wireless communication system, for example, an LTE or LTE-A system or a 5G new radio (NR) system, a base station may configure a terminal so that the terminal receives at least one downlink signal of downlink control information (e.g., a channel state information-reference signal (CSI-RS)), a physical broadcast channel (PBCH), or a physical downlink shared channel (PDSCH)) by transmitting downlink control information (DCI) including assignment information of a resource in which a downlink signal transmitted to the terminal is transmitted through a physical downlink control channel (PDCCH). For example, the base station transmits the DCI, indicating that the terminal needs to receive the PDSCH in a subframe n through the PDCCH, to the terminal in the subframe n. The terminal that has received the DCI receives the PDSCH in the subframe n based on the received downlink control information. Furthermore, in the LTE or LTE-A or NR system, a base station may configure a terminal so that the terminal transmits at least one uplink signal of uplink control information (e.g., a sounding reference signal (SRS) or uplink control information (UCI), or a physical random access channel (PRACH)) or a physical uplink shared channel (PUSCH)) to the base station by transmitting, to the terminal, DCI including uplink resource assignment information through a PDCCH. For example, a terminal that has received, in a subframe n, uplink transmission configuration information (or uplink DCI or an UL grant) transmitted by a base station through a PDCCH may perform the transmission of a PUSCH (hereinafter PUSCH transmission) based on a predefined time (e.g., n+4), a time (e.g., n+k) configured through a higher signal, or uplink signal transmission time indicator information (e.g., n+k) included in uplink transmission configuration information.

If the configured downlink transmission is transmitted from the base station to the terminal through an unlicensed band or the configured uplink transmission is transmitted from the terminal to the base station through an unlicensed band, a transmission device (the base station or the terminal) may perform a channel access procedure (or a listen-before talk (LBT)) on the unlicensed band in which signal transmission has been configured before or right before the start timing of the configured signal transmission. If the unlicensed band is determined to be in an idle state based on a result of the execution of the channel access procedure, the transmission device may access the unlicensed band and perform configured signal transmission. If the unlicensed band is determined to be not in the idle state or the unlicensed band is determined to be in an occupied state based on the channel access procedure performed by the transmission device, the transmission device does not perform the transmission of the configured signal because the transmission device does not access the unlicensed band. In general, in the channel access procedure in the unlicensed band in which the signal transmission has been configured, the transmission device may receive a signal in the unlicensed band for a given time or a time (e.g., a time calculated through one random value selected by at least base station or terminal) calculated according to a predefined rule, and may determine the idle state of the unlicensed band by comparing the intensity of the received signal with a threshold that has been previously defined or that is calculated by a function consisting of at least one variable a channel bandwidth, the bandwidth of a signal to be transmitted, the intensity of transmission power, the beam width of a transmission signal, etc. For example, if the intensity of a signal received for 25 us is smaller than a predefined threshold of −72 dBm, the transmission device may determine that the unlicensed band is in the idle state, and may perform the configured signal transmission. In this case, a maximum time possible for the signal transmission may be limited depending on a maximum channel occupancy time or the type of transmission device (e.g., a base station, a terminal, a master device, or a slave device) that is defined for each country or area in the unlicensed band. For example, in the case of Japan, in a 5 GHz unlicensed band, a base station or a terminal may perform a channel access procedure, and may then transmit a signal by occupying the channel without performing an additional channel access procedure for a maximum of 4 ms time. If the intensity of a signal received for 25 us is greater than a predefined threshold of −72 dBm, a base station may determine that the unlicensed band is not in the idle state, and does not transmit a signal.

In the case of a 5G communication system, in order to provide various services and support a high data transfer rate, various technologies, such as retransmission in a code block group unit and a technology capable of transmitting an uplink signal without uplink scheduling information, have been introduced. Accordingly, if 5G communication is to be performed through an unlicensed band, there is a need for a more efficient channel access procedure in which various variables are taken into consideration.

A wireless communication system deviates from the provision of an initial voice-based service, and develops into a broadband wireless communication system that provides high-speed and high-quality packet data services, for example, communication standards, such as high speed packet access (HSPA) of 3GPP, long term evolution (LTE), evolved universal terrestrial radio access (E-UTRA), LTE-Advanced (LTE-A), high rate packet data (HRPD) of 3GPP2, ultra mobile broadband (UMB), and 802.16e of IEEE. Furthermore, a communication standard of 5G or new radio (NR) is produced as a 5G wireless communication system.

In a wireless communication system including 5G As described above, at least one service of enhanced mobile broadband (eMBB), massive machine type communications (mMTC), and ultra-reliable and low-latency communications (URLLC) may be provided to a terminal. The services may be provided to the same terminal for the same time interval. In an embodiment, the eMBB, the mMTC, and the URLLC may be services aimed at the high-speed transmission of a large amount of data, the minimization of terminal power and the access of multiple terminals, and high reliability and low latency, respectively, but the disclosure is not limited thereto. The three services may be major scenarios in the LTE system or systems, such as 5G/NR (new radio, next radio), after post-LTE.

When a base station schedules, for a terminal, data corresponding to the eMBB service in a specific transmission time interval (TTI), if a situation in which URLLC data has to be transmitted in the TTI occurs, some of eMBB data may not be transmitted in a frequency band in which the eMBB data is already scheduled and transmitted, and the generated URLLC data may be transmitted in the frequency band. A terminal scheduled with the eMBB and a terminal scheduled with the URLLC may be the same terminal or different terminals. In such a case, the probability that the eMBB data may be damaged is increased because there is a portion in which some of the eMBB data that has already been scheduled and transmitted is not transmitted. Accordingly, in such a case, a method of processing a signal received by the terminal scheduled with the eMBB and the terminal scheduled with the URLLC and a method of receiving the signal need to be determined.

Hereinafter, embodiments of the present disclosure are described in detail with reference to the accompanying drawings. Furthermore, terms to be described below have been defined by taking into consideration their functions in the present disclosure, and may be changed depending on a user or operator's intention or practice. Accordingly, such terms should be defined based on the overall contents of this specification. Hereinafter, a base station is a subject that performs resource assignment for a terminal, and may be at least one of an eNode B, a Node B, a base station (BS), a radio access unit, a base station controller, or a node in a network. The terminal may include a user equipment (UE), a mobile station (MS), a cellular phone, a smartphone, a computer, or a multimedia system capable of performing a communication function. In the disclosure, downlink (DL) means a wireless transmission path of a signal that is transmitted from a base station to a terminal, and uplink (UL) means a wireless transmission path of a signal transmitted from a terminal to a base station. Furthermore, hereinafter, an embodiment of the present disclosure is described by taking an LTE or LTE-A system as an example, but an embodiment of the present disclosure is applied to other communication systems having a similar technical background or channel form. For example, a 5G mobile communication technology (5G, new radio (NR)) that is developed after LTE-A may be included in the other communication systems. Furthermore, an embodiment of the present disclosure may also be applied to another communication system through some modifications of the embodiment without greatly departing from the scope of the disclosure based on a determination of a person who has skilled technical knowledge.

As a representative example of the broadband wireless communication system, in an NR system, the orthogonal frequency division multiplexing (OFDM) method is adopted in the downlink (DL), and both the OFDM and single carrier frequency division multiple access (SC-FDMA) methods are adopted in the uplink (UL). The uplink means a radio link through which a terminal (or a UE) or a mobile station (MS) transmits data or a control signal to an eNode B (or a base station (BS)). The downlink means a radio link through which a base station transmits data or a control signal to a terminal. In such a multi-access method, data or control information of users may be distinguished by assigning and operating time-frequency resources on which the data or the control information will be carried and transmitted for each user so that the time-frequency resources do not overlap, that is, orthogonality between the time-frequency resources is established.

In the 5G system, it is necessary to flexibly define and operate a frame structure by taking various services and requirements into consideration. For example, it may be taken into consideration that each service has different subcarrier spacing depending on requirements. In a current 5G communication system, a method of supporting a plurality of subcarrier spacings may be determined by using [Equation 1] below.

$$\Delta f = f0 \cdot 2^m \qquad \text{[Equation 1]}$$

wherein f0 indicates a basic subcarrier spacing of a system, and m indicates a scaling factor of an integer. For example, if f0 is 15 kHz, a set of subcarrier spacings which may be provided to a 5G communication system may include 3.75 kHz, 7.5 kHz, 15 kHz, 30 kHz, 60 kHz, 120 kHz, 240 kHz, 480 kHz, etc. An available subcarrier spacing set may be different depending on a frequency band. For example, 3.75 kHz, 7.5 kHz, 15 kHz, 30 kHz, and 60 kHz may be used in a frequency band of 6 GHz or less. 60 kHz, 120 kHz, and 240 kHz may be used in a frequency band of more than 6 GHz.

The length of a corresponding OFDM symbol may be different depending on subcarrier spacings that constitute an OFDM symbol. This is a characteristic of an OFDM symbol, and the reason for this is that the subcarrier spacing and the length of the OFDM symbol have a reciprocal relationship. For example, if the subcarrier spacing is doubled, the symbol length is reduced by half. Reversely, if the subcarrier spacing is reduced by half, the symbol length is doubled.

An NR system adopts a hybrid automatic repeat request (HARQ) method of retransmitting corresponding data in a physical layer when a decoding failure occurs in initial transmission. The HARQ method enables a receiver to transmit information (negative acknowledgement (NACK)) that notifies a transmitter of a decoding failure so that the transmitter can retransmit data in a physical layer when the receiver fails in accurately decoding the corresponding data. The receiver increases data reception performance by combining the data, retransmitted by the transmitter, with the data whose decoding has previously failed. Furthermore, the HARQ method enables a receiver to transmit, to a transmitter, information (acknowledgement (ACK)) that notifies the transmitter of a decoding success so that the transmitter can transmit new data if the receiver has accurately decoded data.

FIG. 1 is a diagram illustrating a basic structure of a time-frequency region, that is, a radio resource region in which data or a control channel is transmitted in the uplink/downlink of an NR system or a system similar thereto.

Referring to FIG. 1, a transverse axis indicates a time region, and a longitudinal axis indicates a frequency region. A minimum transmission unit in the time region is an OFDM to DFT-s-OFDM symbol. Nsymb 101 OFDMs to DFT-s-OFDM symbols constitute one slot 102. In this case, the OFDM symbol is a symbol for a case in which signals are transmitted and received by using an OFDM multiplexing method. The DFT-s-OFDM symbol represents a symbol for a case in which signals are transmitted and received by using a DFT-s-OFDM or SC-FDMA multiplexing method. Hereinafter, in the disclosure, an OFDM symbol and a DFT-s-OFDM symbol are generally described as an OFDM symbol without distinction of the OFDM symbol and the DFT-s-OFDM symbol, for convenience of description, and will be described on the basis of downlink signal transmission and reception, but may also be applied to uplink signal transmission and reception.

If the interval between subcarriers is 15 kHz, one slot constitutes one subframe 103, and the length of each of the slot and the subframe is 1 ms. In this case, the number of slots constituting one subframe 103 and the length of the slot may be different depending on the interval between subcarriers. For example, if the interval between subcarriers is 30 kHz, four slots may constitute one subframe 103. In this case, the length of the slot is 0.5 ms, and the length of the subframe is 1 ms. Furthermore, a radio frame 104 is a time region interval consisting of 10 subframes. A minimum transmission unit in the frequency region is a subcarrier. The bandwidth of the entire system transmission bandwidth is constituted with a total of NBW (105) subcarriers. However, such detailed numerical values may be variably applied. For example, in the case of the LTE system, the interval between subcarriers is 15 kHz, but two slots constitute to one subframe 103. In this case, the length of the slot is 0.5 ms, and the length of the subframe is 1 ms.

In the time-frequency region, a basic unit of a resource is a resource element (RE) 106, and may be indicated as an OFDM symbol index and a subcarrier index. A resource block (RB) 107 or a physical resource block (PRB) may be defined as Nsymb (101) contiguous OFDM symbols in the time region and NSCRB (108) contiguous subcarriers in the frequency region. Accordingly, in one slot, one RB 107 may include Nsymb×NSCRB REs. In general, a minimum assignment unit of data in the frequency region is the RB 107. In general, in an NR system, the Nsymb=14, NSCRB=12, the number (NRB) of RBs may vary depending on a bandwidth of a system transmission band. In general, in the LTE system, the Nsymb=7, NSCRB=12, and NRB may vary depending on a bandwidth of a system transmission band.

Downlink control information may be transmitted within the first N OFDM symbols in a subframe. In general, N may be (1, 2, 3). A terminal may be configured with the number of symbols in which the downlink control information may be transmitted through a higher signal from a base station. Furthermore, the base station may change the number of symbols in which downlink control information may be transmitted in a current slot for each slot depending on the amount of control information that needs to be transmitted in the slot, and may transmit information on the number of symbols to the terminal through a separate PDCCH.

In NR, one component carrier (CC) or serving cell may be constituted with a maximum of 250 RBs or more. Accordingly, if a terminal always receives the entire serving cell bandwidth as in LTE, power consumption of the terminal may be severe. In order to solve such a problem, a base station may support the configuration of one or more bandwidth parts (BWPs) for the terminal so that the terminal may change a reception region within a cell. In NR, a base station may configure an "initial BWP", that is, the bandwidth of a CORESET #0 (or a common search space (CSS)), for a terminal through a master information block (MIB). Thereafter, the base station may configure the first BWP of the terminal through RRC signaling, and may notify at least one piece of BWP configuration information which may be indicated through downlink control information (DCI) in the future. Thereafter, the base station may indicate which band will be used by the terminal by notifying the terminal of a BWP ID through the DCI. If the terminal does not receive the DCI in a BWP that is now assigned for a specific time or more, the terminal returns to a "default BWP" and attempts DCI reception.

Figure 2:
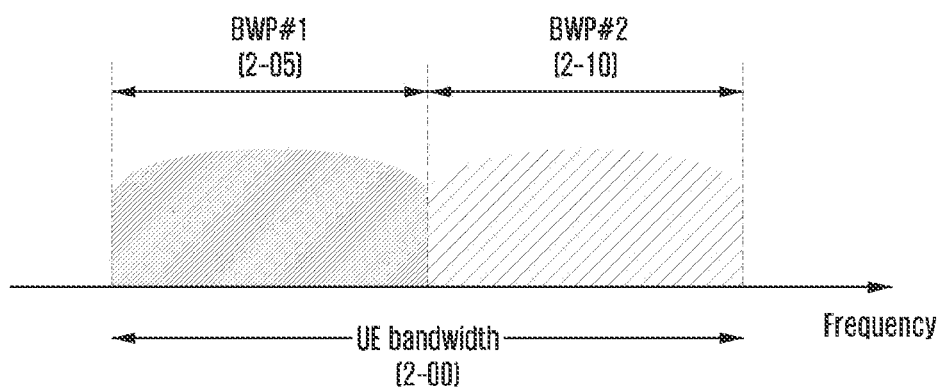
FIG. 2 is a diagram illustrating an example in which a terminal bandwidth has been configured as two bandwidth parts (BWPs) according to an embodiment of the disclosure.

Referring to FIG. 2, FIG. 2 illustrates an example in which a UE bandwidth 2-00 is constituted with two BWPs, that is, a BWP #1 (2-05) and a BWP #2 (2-10). A base station may configure one or multiple BWPs for a UE, and may configure information, such as [Table 1] below, with respect to each BWP.

TABLE 1

| | |
|---|---|
| BWP ::= | SEQUENCE { |
| bwp-Id | BWP-Id, |
| locationAndBandwidth | INTEGER (1..65536), |
| subcarrierSpacing | ENUMERATED {n0, n1, n2, n3, n4, n5}, |
| cyclicPrefix | ENUMERATED { extended } |
| } | |

The disclosure is not limited to the aforementioned example. In addition to the aforementioned configuration information, various parameters related to the BWP may be configured for the UE. The base station may transmit the aforementioned information to the UE through higher layer signaling, for example, RRC signaling. At least one BWP among the configured one or multiple BWPs may be activated. Whether to activate the configured BWP may be semi-statically transmitted through RRC signaling or may be dynamically through a MAC control element (CE) or DCI from the base station to the UE.

According to an embodiment, a UE before a radio resource control (RRC) connection may be configured with an initial BWP for initial access from a base station through a master information block (MIB). More specifically, the UE may receive configuration information for a control resource set (CORESET) and a search space in which a PDCCH may be transmitted, in order to receive system information (may correspond to remaining system information (RMSI) or a system information block 1 (SIB1)) that is necessary for the initial access through the MIB in an initial access step. Each of the CORESET and the search space configured through the MIB may be considered as an identity (ID) 0.

The base station may notify the UE of frequency assignment information for a CORESET #0, time assignment information, configuration information such as numerology through the MIB. Furthermore, the base station may notify the UE of configuration information for the monitoring period and occasion of the CORESET #0, that is, configuration information for a search space #0, through the MIB. The UE may consider, as an initial BWP for the initial access, a frequency region configured as the CORESET #0 obtained from the MIB. In this case, the ID of the initial BWP may be considered as 0.

In a method of configuring the aforementioned BWP, UEs before an RRC connected may receive configuration information for an initial BWP through an MIB in an initial access step. More specifically, a UE may be configured with a control resource set (or a CORESET) for a PDCCH in which DCI that schedules a system information block (SIB) may be transmitted from an MIB of a physical broadcast channel (PBCH). The bandwidth of the CORESET configured through the MIB may be considered as an initial BWP. The UE may receive a PDSCH in which the SIB is transmitted through the configured initial BWP. In addition to the use for SIB reception, the initial BWP may be used for other system information (OSI), paging, and random access.

Hereinafter, a synchronization signal/PBCH block (SSB) of a next-generation mobile communication system (a 5G or NR system) is described.

An SS/PBCH block may mean a physical layer channel block constituted with a primary SS (PSS), a secondary SS (SSS), and a PBCH. More specifically, the SS/PBCH block may be defined as follows.

PSS: this is a signal, that is, a reference for downlink time/frequency synchronization, and may provide some information of a cell ID.

SSS: this becomes a reference for downlink time/frequency synchronization, and may provide the remaining cell ID information that is not provided by a PSS. Additionally, the SSS may play a role as a reference signal for the demodulation of a PBCH.

PBCH: this may provide essential system information that is necessary for the transmission and reception of a data channel and control channel of a UE. The essential system information may include search space-related control information indicative of radio resource mapping information of a control channel, scheduling control information for a separate data channel in which system information is transmitted, etc.

SS/PBCH block: the SS/PBCH block may be constituted of a combination of a PSS, an SSS, and a PBCH. One or a plurality of SSs/PBCH blocks may be transmitted within a 5 ms time. Each SS/PBCH block that is transmitted may be distinguished based on an index.

A UE may detect a PSS and an SSS in an initial access step, and may decode a PBCH. The UE may obtain an MIB from the PBCH, and may be configured with a CORESET #0 through the MIB. The UE may perform monitoring on the CORESET #0, assuming that a demodulation reference signal (DMRS) transmitted in a selected SS/PBCH block and the CORESET #0 has been subjected to quasi-co-location (QCL). The UE may receive system information as downlink control information transmitted in the CORESET #0. The UE may obtain random access channel (RACH)-related configuration information that is necessary for initial access from the received system information. The UE may transmit a physical RACH (PRACH) to a base station by taking into consideration the selected SS/PBCH index. The base station that has received the PRACH may obtain information on the SS/PBCH block index selected by the UE. The base station may be aware that the UE has selected which one of the SS/PBCH blocks and the UE monitors the CORESET #0 corresponding to (or associated with) the selected SS/PBCH block.

Hereinafter, downlink control information (hereinafter referred to as DCI) in a next-generation mobile communication system (a 5G or NR system) is specifically described.

Scheduling information for uplink data (or a PUSCH) or downlink data (or a PDSCH) in a next-generation mobile communication system (a 5G or NR system) may be transmitted from a base station to a UE through DCI. The UE may monitor a DCI format for fallback and a DCI format for non-fallback with respect to the PUSCH or the PDSCH. The DCI format for fallback may be constituted with a fixed field that has been predefined between the base station and the UE. The DCI format for non-fallback may include a configurable field.

DCI may be transmitted through a physical downlink control channel (PDCCH), that is, a PDCCH via a channel coding and modulation process. Cyclic redundancy check (CRC) may be attached to DCI message payload. The CRC may be scrambled by a radio network temporary identifier (RNTI) that corresponds to the identity of a UE. Different RNTIs may be used for the scrambling of CRC attached to the payload of a DCI message depending on a purpose of the DCI message, for example, UE-specific data transmission, a power control command, or a random access response. That is, the RNTI is not explicitly transmitted, and may be included in a CRC calculation process and transmitted. When receiving the DCI message transmitted on the PDCCH, the UE may validate the CRC by using the assigned RNTI. If a result of the CRC validation is correct, the UE may be aware that the corresponding message has been transmitted to the UE.

For example, DCI that schedules a PDSCH for system information (SI) may be scrambled by an SI-RNTI. DCI that schedules a PDSCH for a random access response (RAR) message may be scrambled by an RA-RNTI. DCI that schedules a PDSCH for a paging message may be scrambled by a P-RNTI. DCI that provides notification of a slot format indicator (SFI) may be scrambled by an SFI-RNTI. DCI that provides notification of transmit power control (TPC) may be scrambled by a TPC-RNTI. DCI that schedules a UE-specific PDSCH or PUSCH may be scrambled by a cell RNTI (C-RNTI).

A DCI format 0_0 may be used as fallback DCI that schedules a PUSCH. In this case, CRC may be scrambled by a C-RNTI. In an embodiment, the DCI format 0_0 in which the CRC is scrambled by the C-RNTI may include information, such as [Table 2] below.

TABLE 2

Identifier for DCI formats - [1] bit
Frequency domain resource assignment - $\lceil \log_2(N_{RB}^{UL,BWP} (N_{RB}^{UL,BWP} + 1)/2) \rceil$ bits
Time domain resource assignment - X bits
Frequency hopping flag - 1 bit
Modulation and coding scheme - 5 bits
New data indicator - 1 bit
Redundancy version - 2 bits
HARQ process number - 4 bits
TPC command for scheduled PUSCH - [2] bits
- UL/SUL indicator - 0 or 1 bit A DCI format 0_1 may be used as non-fallback DCI that schedules a PUSCH. In this case, CRC may be scrambled by a C-RNTI. In an embodiment, the DCI format 0_1 in which the CRC is scrambled by the C-RNTI may include information, such as [Table 3] below.

TABLE 3

Carrier indicator - 0 or 3 bits
UL/SUL indicator - 0 or 1 bit
Identifier for DCI formats - [1] bits
Bandwidth part indicator - 0, 1 or 2 bits
Frequency domain resource assignment
For resource allocation type 0, $\lceil N_{RB}^{UL,BWP}/P \rceil$ bits
For resource allocation type 1, $\lceil \log_2(N_{RB}^{UL,BWP} (N_{RB}^{UL,BWP} + 1)/2) \rceil$ bits
Time domain resource assignment - 1, 2, 3, or 4 bits
VRB-to-PRB mapping - 0 or 1 bit, only for resource allocation type 1
0 bit if only resource allocation type 0 is configured;
1 bit otherwise.
Frequency hopping flag - 0 or 1 bit, only for resource allocation type 1
0 bit if only resource allocation type 0 is configured;
1 bit otherwise.
Modulation and coding scheme - 5 bits
New data indicator - 1 bit
Redundancy version - 2 bits
HARQ process number - 4 bits
$1^{st}$ downlink assignment index - 1 or 2 bits
1 bit for semi-static HARQ-ACK codebook;
2 bits for dynamic HARQ-ACK codebook with single HARQ-ACK codebook.
$2^{nd}$ downlink assignment index - 0 or 2 bits
2 bits for dynamic HARQ-ACK codebook with two HARQ-ACK sub-codebooks;
0 bit otherwise.
TPC command for scheduled PUSCH - 2 bits
SRS resource indicator - $\lceil \log_2 (\Sigma_{k=1}^{L_{max}} \binom{N_{SRS}}{k}) \rceil$ or $\lceil \log_2(N_{SRS}) \rceil$ bits
• $\lceil \log_2 (\Sigma_{k=1}^{L_{max}} \binom{N_{SRS}}{k}) \rceil$ bits for non-codebook based PUSCH transmission
$\lceil \log_2(N_{SRS}) \rceil$ bits for codebook based PUSCH transmission
Precoding information and number of layers - up to 6 bits
Antenna ports - up to 5 bits
SRS request - 2 bits
CSI request - 0, 1, 2, 3, 4, 5, or 6 bits
CBG transmission information - 0, 2, 4, 6, or 8 bits
PTRS-DMRS association - 0 or 2 bits
beta_offset indicator - 0 or 2 bits
- DMRS sequence initialization - 0 or 1 bit A DCI format 1_0 may be used as fallback DCI that schedules a PDSCH. In this case, CRC may be scrambled by a C-RNTI. In an embodiment, the DCI format 1_0 in which the CRS is scrambled by the C-RNTI may include information, such as [Table 4] below.

TABLE 4

Identifier for DCI formats - [1] bit
Frequency domain resource assignment - $\lceil \log_2(N_{RB}^{DL,BWP} (N_{RB}^{DL,BWP} + 1/2) \rceil$ bits
Time domain resource assignment - X bits
VRB-to-PRB mapping - 1 bit
Modulation and coding scheme - 5 bits
New data indicator - 1 bit
Redundancy version - 2 bits
HARQ process number - 4 bits TABLE 4-continued Downlink assignment index - 2 bits
TPC command for scheduled PUCCH - [2] bits
PUCCH resource indicator - 3 bits
- PDSCH-to-HARQ_feedback timing indicator - [3]

Alternatively, the DCI format 1_0 may be used as DCI that schedules a PDSCH for an RAR message. In this case, CRC may be scrambled by an RA-RNTI. The DCI format 1_0 in which the CRC is scrambled by the C-RNTI may include information, such as [Table 5] below.

TABLE 5

Frequency domain resource assignment - $\lceil \log_2(N_{RB}^{DL,BWP} (N_{RB}^{DL,BWP} + 1)/2) \rceil$ bits
Time domain resource assignment- 4 bits
VRB-to-PRB mapping - 1 bit
Modulation and coding scheme- 5 bits
TB scaling - 2 bits
- Reserved bits - 16bits A DCI format 1_1 may be used as non-fallback DCI that schedules a PDSCH. In this case, CRC may be scrambled by a C-RNTI. In an embodiment, the DCI format 1_1 in which the CRC is scrambled by the C-RNTI may include information, such as [Table 6] below.

TABLE 6

Carrier indicator - 0 or 3 bits
Identifier for DCI formats - [1] bits
Bandwidth part indicator - 0, 1 or 2 bits
Frequency domain resource assignment
For resource allocation type 0, $\lceil N_{RB}^{DL,BWP}/P \rceil$ bits
For resource allocation type 1, $\lceil \log_2(N_{RB}^{DL,BWP} (N_{RB}^{DL,BWP} + 1)/2) \rceil$ bits
Time domain resource assignment - 1, 2, 3, or 4 bits
VRB-to-PRB mapping - 0 or 1 bit, only for resource allocation type 1.
0 bit if only resource allocation type 0 is configured;
1 bit otherwise.
PRB bundling size indicator - 0 or 1 bit
Rate matching indicator - 0, 1, or 2 bits
ZP CSI-RS trigger - 0, 1, or 2 bits
For transport block 1:
Modulation and coding scheme - 5 bits
New data indicator - 1 bit
- Redundancy version - 2 bits
For transport block 2:
Modulation and coding scheme - 5 bits
New data indicator - 1 bit
Redundancy version - 2 bits
HARQ process number - 4 bits
Downlink assignment index - 0 or 2 or 4 bits
TPC command for scheduled PUCCH - 2 bits
PUCCH resource indicator - 3 bits
PDSCH-to-HARQ_feedback timing indicator -3 bits
Antenna ports - 4, 5, or 6 bits
Transmission configuration indication - 0 or 3 bits
SRS request - 2 bits TABLE 6-continued CBG transmission information - 0, 2, 4, 6, or 8 bits
CBG flushing out information - 0 or 1 bit
- DMRS sequence initialization - 1 bit FIG. 3 is a diagram illustrating an embodiment of a control resource set (CORESET) in which a PDCCH is transmitted in a 5G wireless communication system according to an embodiment of the disclosure.

Figure 3:
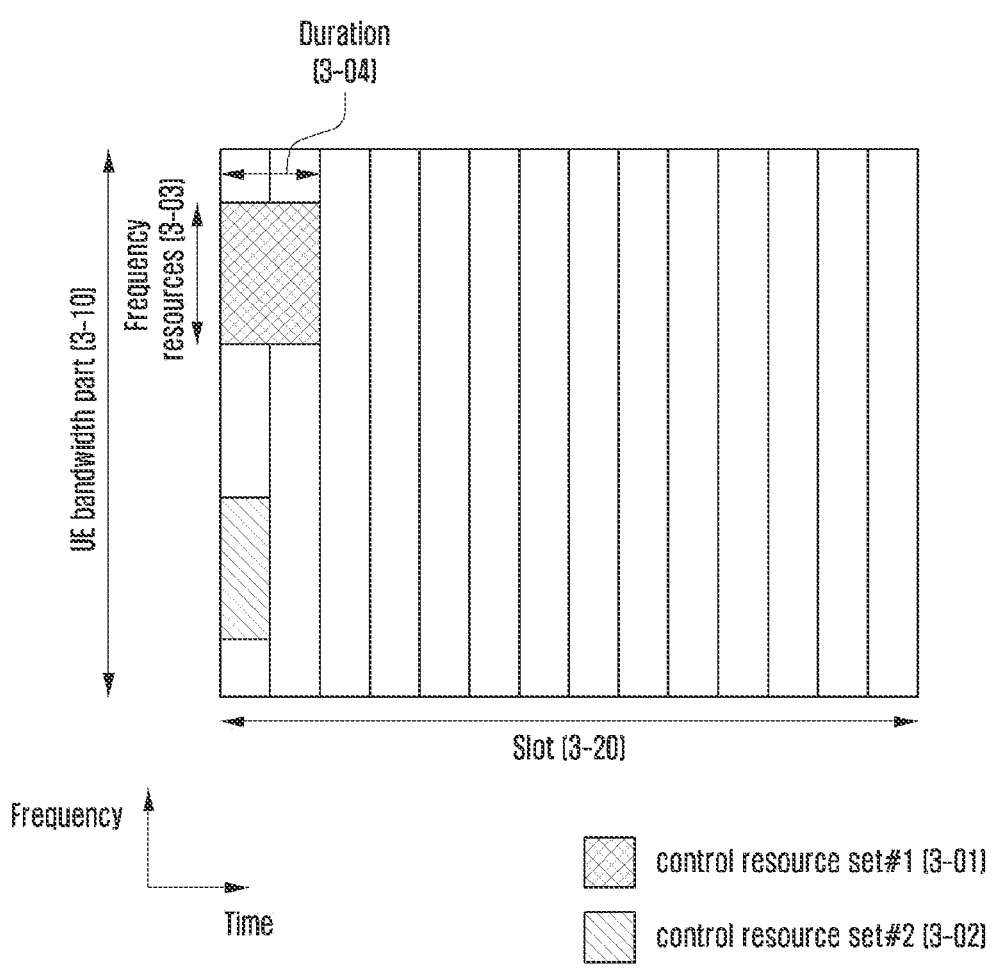
FIG. 3 is a diagram illustrating an embodiment of a control resource set (CORESET) in which a downlink control channel is transmitted in a 5G wireless communication system according to an embodiment of the disclosure.

Referring to FIG. 3, FIG. 3 illustrates an embodiment in which a UE BWP 3-10 in a frequency domain and two CORESETs (CORESET #1 3-01 and CORESET #2 3-02) within one slot 3-20 in a time domain have been configured. The CORESETs 3-01 and 3-02 may be configured in a specific frequency resource 3-03 within the entire UE BWP 3-10 in the frequency domain. The CORESETs 3-01 and 3-02 may be configured as one or a plurality of OFDM symbols in the time domain. This may be defined as CORESET duration 3-04. With reference to FIG. 3, the CORESET #1 3-01 may be configured as CORESET duration of two symbols. The CORESET #2 3-02 may be configured as CORESET duration of one symbol.

A CORESET in the aforementioned next-generation mobile communication system (5G or NR system) may be configured from a base station to a UE through higher layer signaling (e.g., system information, master information block (MIB), or radio resource control (RRC) signaling). To configure a CORESET for a UE means that information, such as a CORESET identity, a frequency location of the CORESET, or a symbol length of the CORESET, is provided. For example, a configuration of a CORESET may include information, such as [Table 7] below.

TABLE 7

```
ControlResourceSet ::=            SEQUENCE {
Corresponds to L1 parameter 'CORESET-ID'
controlResourceSetId              ControlResourceSetId,
frequencyDomainResources            BIT STRING (SIZE (45)),
duration                          INTEGER (1..maxCoReSetDuration),
cce-REG-MappingType                 CHOICE {
interleaved                       SEQUENCE {
reg-BundleSize                    ENUMERATED {n2, n3, n6},
precoderGranularity                 ENUMERATED     {sameAsREG-bundle,
allContiguousRBs},
```

TABLE 7-continued

| | |
|---|---|
| interleaverSize | ENUMERATED {n2, n3, n6} |
| shiftIndex | INTEGER(0..maxNrofPhysicalResourceBlocks-1) |
| }, | |
| nonInterleaved | NULL |
| }, | |
| tci-StatesPDCCH | SEQUENCE( SIZE (1..maxNrofTCI- |
| StatesPDCCH)) OF TCI-StateId | OPTIONAL, |
| tci-PresentInDCI | ENUMERATED {enabled} |
| } | |

In [Table 7], tci-StatesPDCCH (hereinafter referred to as a "TCI state") configuration information may include information of one or multiple synchronization signals (SSsy-physical broadcast channel (PBCH) block indices or channel state information reference signal (CSI-RS) indices having a quasi co-located (QCL) relation with a demodulation reference signal (DMRS) that is transmitted in a corresponding CORESET. Furthermore, frequencyDomainResources configuration information configures a frequency resource of a corresponding CORESET in the form of a bitmap. In this case, each bit indicates a group in which six PRBs not overlapped are bound. The first group means six PRB groups having the first PRB index as $6 \cdot \lceil N_{BWP}^{start}/6 \rceil$. In this case, $N_{BWP}^{start}$ indicates a BWP start point. The most significant bit of the bitmap indicates the first group, and is configured in ascending order.

In a wireless communication system, one or more different antenna ports (or may be replaced with one or more channels, signals, and combinations of them, but they are unified and denoted as different antenna ports for convenience in the description of the disclosure in the future) may be associated by a QCL configuration, such as [Table 8] below.

TABLE 8

| | |
|---|---|
| QCL-Info ::= | SEQUENCE { |
| cell | ServCellIndex |
| bwp-Id | BWP-Id |
| referenceSignal | CHOICE { |
| csi-rs | NZP-CSI-RS-ResourceId, |
| ssb | SSB-Index |
| }, | |
| qcl-Type | ENUMERATED {type A, typeB, typeC, typeD}, |
| ... | |
| } | |

Specifically, the QCL configuration may associate two different antenna ports as a relation between a (QCL) target antenna port and a (QCL) reference antenna port. A terminal may apply (or assume) some or all of statistical characteristics (e.g., large scale parameters of a channel, such as a Doppler shift, Doppler spread, average delay, delay spread, an average gain, and a spatial Rx (or Tx) parameter, to a reception space filter coefficient or transmission space filter coefficient of the terminal) of a channel that is measured in a reference antenna port, when receiving a target antenna port. The target antenna port means an antenna port that transmits a channel or signal configured by a higher layer configuration including the QCL configuration to an antenna port that transmits a channel or signal to which a TCI state indicative of the QCL configuration is applied. The reference antenna port means an antenna port that transmits a channel or signal indicated (specified) by a referenceSignal parameter within the QCL configuration.

Specifically, the statistical characteristics of a channel defined by the QCL configuration (indicated by parameter qcl-Type within the QCL configuration) may be classified as follows depending on a QCL type.

"QCL-TypeA": {Doppler shift, Doppler spread, average delay, delay spread}
"QCL-TypeB": {Doppler shift, Doppler spread}
"QCL-TypeC": {Doppler shift, average delay}
"QCL-TypeD": {Spatial Rx parameter}

In this case, the type of QCL type is not limited to the four types, but all possible combinations thereof are not enumerated in order to prevent the subject matter of the description from being obscured. In the above description, QCL-TypeA is a QCL type that is used when all of statistical characteristics measurable in the frequency and time axes are referenceable because the bandwidth and transmission interval of a target antenna port are sufficient compared to a reference antenna port (i.e., when the number of samples and the transmission band/time of the target antenna port are greater than the number of samples and the transmission band/time of the reference antenna port in both the frequency domain and the time domain). QCL-TypeB is a QCL type that is used when the bandwidth of a target antenna port is sufficient to measure statistical characteristics measurable in the frequency domain, that is, a Doppler shift and Doppler spread. QCL-TypeC is a QCL type that is used when only first-order statistics, that is, a Doppler shift and average delay, are referenceable because the bandwidth and transmission interval of a target antenna port are insufficient to measure second-order statistics, that is, Doppler spread and delay spread. QCL-TypeD is a QCL type that is configured when spatial reception filter values used when a reference antenna port is received may be used to receive a target antenna port.

Meanwhile, a base station may configure or indicate a maximum of two QCL configurations in one target antenna port through a TCI state configuration, such as Table 9a below.

TABLE 9a

| | | |
|---|---|---|
| TCI-State ::= | SEQUENCE { | |
| tci-StateId | TCI-StateId, | |
| qcl-Type1 | QCL-Info, | |
| qcl-Type2 | QCL-Info | OPTIONAL, -- Need R |
| ... | | |
| } | | |

The first QCL configuration among two QCL configurations included in one TCI state configuration may be configured as one of QCL-TypeA, QCL-TypeB, or QCL-TypeC. In this case, a configurable QCL type is specified depending on the type of target antenna port and reference antenna port, and is described in detail below. Furthermore, the second QCL configuration among the two QCL configurations included in the one TCI state configuration may be configured as QCL-TypeD, and may be omitted in some cases.

Table 9ba to Table 9be below are tables indicative of valid TCI state configurations according to the type of target antenna port.

Table 9ba illustrates a valid TCI state configuration when a target antenna port is a CSI-RS for tracking (TRS). The TRS means an NZP CSI-RS in which a repetition parameter is not configured and trs-Info is configured as "true", among CSI-RSs. In Table 9ba, a No. 3 configuration may be used for an aperiodic TRS.

TABLE 9ba a valid TCI state configuration when a target antenna port is a CSI-RS for tracking (TRS)

| Valid TCI state Configuration | DL RS 1 | qcl-Type1 | DL RS 2 (if configured) | qcl-Type2 (if configured) |
|---|---|---|---|---|
| 1 | SSB | QCL-TypeC | SSB | QCL-TypeD |
| 2 | SSB | QCL-TypeC | CSI-RS (BM) | QCL-TypeD |
| 3 | TRS (periodic) | QCL-TypeA | TRS (same as DL RS 1) | QCL-TypeD |

Table 9bb illustrates a valid TCI state configuration when a target antenna port is a CSI-RS for CSI. The CSI-RS for CSI means an NZP CSI-RS in which a repetition parameter is not configured and trs-Info is also not configured as "true" among CSI-RSs.

TABLE 9bb a valid TCI state configuration when a target antenna port is a CSI-RS for CSI

| Valid TCI state Configuration | DL RS 1 | qcl-Type1 | DL RS 2 (if configured) | qcl-Type2 (if configured) |
|---|---|---|---|---|
| 1 | TRS | QCL-TypeA | SSB | QCL-TypeD |
| 2 | TBS | QCL-TypeA | CSI-RS for BM | QCL-TypeD |
| 3 | TRS | QCL-TypeA | TRS (same as DL RS 1) | QCL-TypeD |
| 4 | TRS | QCL-TypeB | | |

Table 9bc illustrates a valid TCI state configuration when a target antenna port is a CSI-RS for beam management (having the same meaning as BM, a CSI-RS for L1 RSRP reporting). The CSI-RS for BM means an NZP CSI-RS in which a repetition parameter is configured and has an on or off value and trs-Info is not configured as "true" among CSI-RSs.

TABLE 9bc a valid TCI state configuration when a target antenna port is a CSI-RS for BM (for L1 RSRP reporting)

| Valid TCI state Configuration | DL RS 1 | qcl-Type 1 | DL RS 2 (if configured) | qcl-Type2 (if configured) |
|---|---|---|---|---|
| 1 | TRS | QCL-TypeA | TRS (same as DL RS 1) | QCL-TypeD |
| 2 | TRS | QCL-TypeA | CSI-RS (BM) | QCL-TypeD |
| 3 | SS/PBCH Block | QCL-TypeC | SS/PBCH Block | QCL-TypeD |

Table 9bd illustrates a valid TCI state configuration when a target antenna port is a PDCCH DMRS.

TABLE 9bd a valid TCI state configuration when a target antenna port is a PDCCH DMRS

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS (same as DL RS 1) | QCL-TypeD |
| 2 | TRS | QCL-TypeA | CSI-RS (BM) | QCL-TypeD |
| 3 | CSI-RS (CSI) | QCL-TypeA | CSI-RS (same as DL RS 1) | QCL-TypeD |

Table 9be illustrates a valid TCI state configuration when a target antenna port is a PDSCH DMRS.

TABLE 9be a valid TCI state configuration when a target antenna port is a PDSCH DMRS

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | CSI-RS (CSI) | QCL-TypeD |

A representative QCL configuration method according to Table 9ba to 9be is to configure and operate a target antenna port and reference antenna port for each step like "SSB"→"TRS"→"CSI-RS for CSI, or CSI-RS for BM, or the PDCCH DMRS, or the PDSCH DMRS." Accordingly, it is possible to help a reception operation of a terminal by associating statistical characteristics which may be measured from an SSB and a TRS with up to each antenna port.

Figure 4:
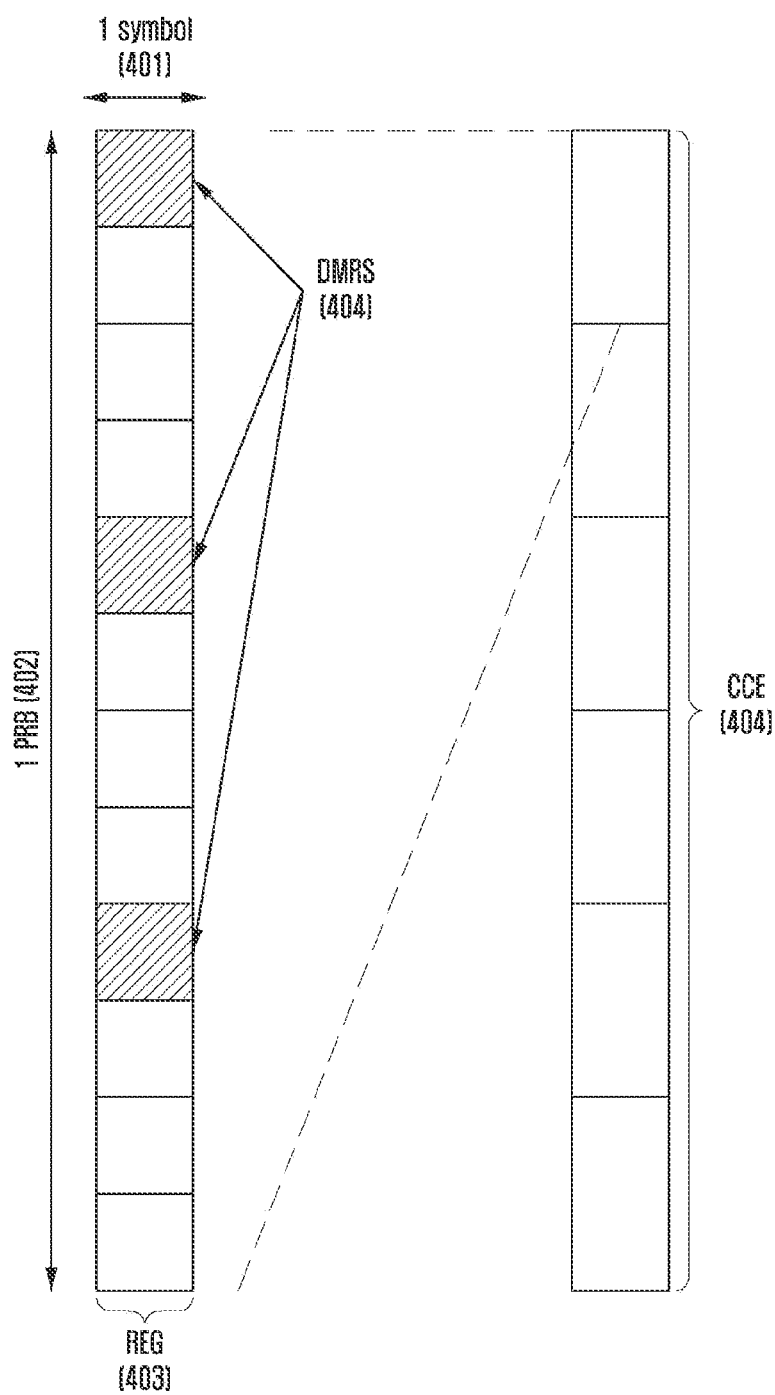
FIG. 4 is a diagram describing a structure of a downlink control channel in a wireless communication system according to an embodiment of the disclosure.

FIG. 4 is a diagram describing a structure of a PDCCH in a wireless communication system according to an embodiment of the disclosure. That is, FIG. 4 is a diagram illustrating an example of a basic unit of a time and frequency resource that constitutes a PDCCH which may be used in 5G according to an embodiment of the disclosure.

Referring to FIG. 4, the basic unit of the time and frequency resource that constitutes a control channel may be defined as a resource element group (REG) 403. The REG 403 may be defined as one OFDM symbol 401 in a time domain and one physical resource block (PRB) 402, that is, 12 subcarriers, in a frequency domain. A base station may constitute a PDCCH assignment unit by connecting the REGs 403.

As illustrated in FIG. 4, if a basic unit by which a PDCCH is assigned in 5G is a control channel element (CCE) 404, one CCE 404 may be constituted with a plurality of REGs 403. For example, the REG 403 illustrated in FIG. 4 may be constituted with 12 REs. If one CCE 404 is constituted with six REGs 403, one CCE 404 may be constituted with 72 REs. If a downlink CORESET is configured, the corresponding CORESET may be constituted with a plurality of CCEs 404. A specific PDCCH may be transmitted by being mapped as one or a plurality of CCEs 404 depending on an aggregation level (AL) within a CORESET. The CCEs 404 within the CORESET are distinguished by numbers. In this case, the numbers of the CCEs 404 may be assigned according to a logical mapping method.

The basic unit of the PDCCH illustrated in FIG. 4, that is, the REG 403 may include REs to which DCI is mapped and a region to which a DMRS 405, that is, a reference signal for decoding the DCI, is mapped. As in FIG. 4, three DMRSs 405 may be transmitted within one REG 403. The number of CCEs necessary to transmit a PDCCH may be 1, 2, 4, 8, or 16 depending on an aggregation level (AL). The number of different CCEs may be used to implement the link adaptation of a PDCCH. For example, when AL=L, one PDCCH may be transmitted through L CCEs.

A terminal needs to detect a signal in the state in which the terminal is unaware of information on a PDCCH. A search space indicative of a set of CCEs may be defined for blind decoding. The search space is a set of PDCCH candidates constituted with CCEs on which the terminal has to attempt decoding on a given aggregation level. The terminal may have a plurality of search spaces because there are several aggregation levels in which one bundle is constituted with 1, 2, 4, 8, or 16 CCEs. A search space set may be defined as a set of search spaces in all of configured aggregation levels.

The search space may be classified into a common search space and a UE-specific search space. According to an embodiment of the present disclosure, a given group of terminals or all terminals may examine a common search space of a PDCCH in order to receive dynamic scheduling for system information or cell-common control information, such as a paging message.

For example, a terminal may search a common search space of a PDCCH for PDSCH scheduling assignment information for the transmission of an SIB including service provider information of a cell, etc., and may receive the PDSCH scheduling assignment information. In the case of the common search space, a given group of terminals or all terminals have to receive a PDCCH. Accordingly, the common search space may be defined as a set of previously agreed CCEs. Meanwhile, the terminal may search a UE-specific search space of a PDCCH for scheduling assignment information for a UE-specific PDSCH or PUSCH, and may receive the scheduling assignment information. The UE-specific search space may be defined as a function of the identity of the terminal and various system parameters in a UE-specific way.

In 5G, a parameter for a search space for a PDCCH may be configured from a base station to a terminal through higher layer signaling (e.g., an SIB, an MIB, or RRC signaling). For example, the base station may configure, for the terminal, the number of PDCCH candidates in each aggregation level L, a monitoring period for the search space, a monitoring occasion of a symbol unit within a slot for the search space, a search space type (a common search space or a UE-specific search space), a DCI format to be monitored in the corresponding search space, a combination of RNTIs, a CORESET index at which the search space is to be monitored, etc. For example, the aforementioned configuration may include information, such as [Table 10] below.

TABLE 10

```
SearchSpace ::=                        SEQUENCE {
Identity of the search space. SearchSpaceId = 0 identifies the SearchSpace configured via
PBCH (MIB) or ServingCellConfigCommon.
searchSpaceId                          SearchSpaceId,
controlResourceSetId                   ControlResourceSetId,
monitoringSlotPeriodicityAndOffset         CHOICE {
sl1                                    NULL
sl2                                    INTEGER (0..1),
sl4                                    INTEGER (0..3),
sl5                                    INTEGER (0..4),
sl8                                    INTEGER (0..7),
sl10                                   INTEGER (0..9),
sl16                                   INTEGER (0..15),
sl20                                   INTEGER (0..19)
}
duration                      INTEGER (2..2559)
monitoringSymbolsWithinSlot           BIT STRING (SIZE (14))
nrofCandidates                         SEQUENCE {
aggregationLevel1                      ENUMERATED {n0, n1, n2, n3, n4, n5, n6, n8},
aggregationLevel2                      ENUMERATED {n0, n1, n2, n3, n4, n5, n6, n8},
aggregationLevel4                      ENUMERATED {n0, n1, n2, n3, n4, n5, n6, n8},
aggregationLevel8                      ENUMERATED {n0, n1, n2, n3, n4, n5, n6, n8},
aggregationLevel16                     ENUMERATED {n0, n1, n2, n3, n4, n5, n6, n8}
},
search SpaceType                         CHOICE {
Configures this search space as common search space (CSS) and DCI formats to monitor,
common                                 SEQUENCE {
}
ue-Specific                            SEQUENCE {
Indicates whether the UE monitors in this USS for DCI formats 0-0 and 1-0 or for formats 0-
1 and 1-1.
formats                                ENUMERATED {formats0-0-And-1-0, formats0-1-
And-1-1),
...
}
```

A base station may configure one or a plurality of search space sets for a terminal based on configuration information. According to an embodiment of the present disclosure, a base station may configure a search space set 1 and a search space set 2 for a terminal, may configure the terminal so that the terminal monitors, in a common search space, a DCI format A scrambled by an X-RNTI in the search space set 1, and may configure the terminal so that the terminal monitors, in a UE-specific search space, a DCI format B scrambled by a Y-RNTI in the search space set 2.

According to configuration information, a common search space or a E-specific search space may include one or a plurality of search space sets. For example, a search space set #1 and a search space set #2 may be configured as common search spaces, and a search space set #3 and a search space set #4 may be configured as UE-specific search spaces.

The common search space may be classified as a specific type of a search space set depending on its purpose. RNTIs to be monitored may be different from each other for each determined search space set type. For example, the common search space type, the purpose, and the RNTI to be monitored may be classified as in Table 10a.

TABLE 10a

| Search space type | Purpose | RNTI |
|---|---|---|
| Type0 CSS | PDCCH transmission for an SIB schedule | SI-RNTI |
| Type0A CSS | PDCCH transmission for another SI schedule (SIB2, etc) other than SIB1 | SI-RNTI |
| Type1 CSS | PDCCH transmission for a random access response (RAR), an Msg3 retransmission schedule, an Msg4 schedule | RA-RNTI, TC-RNTI |
| Type2 CSS | Paging | P-RNTI |
| Type3 CSS | Group control information transmission | INT-RNTI, SFI-RNTI, TPC-PUSCH-RNTI, TPC-PUCCH-RNTI, TPC-SRS-RNTI |
|  | In the case of PCell, PDCCH transmission for a data schedule | C-RNTI, MCS-C-RNTI, CS-RNTI |

Meanwhile, in the common search space, the following combinations of a DCI format and an RNTI may be monitored. The disclosure is not limited to the following example.

DCI format 0_0/1_0 with CRC scrambled by C-RNTI, CS-RNTI, SP-CSI-RNTI, RA-RNTI, tC-RNTI, P-RNTI, SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI, tPC-PUCCH-RNTI DCI format 2_3 with CRC scrambled by TPC-SRS-RNTI In the UE-specific search space, the following combinations of a DCI format and an RNTI may be monitored. The disclosure is not limited to the following example.

DCI format 0_0/1_0 with CRC scrambled by C-RNTI, CS-RNTI, tC-RNTI

DCI format 1_0/1_1 with CRC scrambled by C-RNTI, CS-RNTI, tC-RNTI

The specified RNTIs may follow the following definitions and uses.

C-RNTI (Cell RNTI): use for UE-specific PDSCH scheduling

TC-RNTI (Temporary Cell RNTI): use for UE-specific PDSCH scheduling

CS-RNTI (Configured Scheduling RNTI): use for semi-statically configured UE-specific PDSCH scheduling RA-RNTI (Random Access RNTI): use for PDSCH scheduling in a random access step P-RNTI (Paging RNTI): use for the scheduling of a PDSCH in which paging is transmitted SI-RNTI (System Information RNTI): use for the scheduling of a PDSCH in which system information is transmitted INT-RNTI (Interruption RNTI): use for providing notification of whether to puncture a PDSCH TPC-PUSCH-RNTI (Transmit Power Control for the PUSCH RNTI): use for indicating a power adjustment command for a PUSCH TPC-PUCCH-RNTI (Transmit Power Control for the PUCCH RNTI): use for indicating a power adjustment command for a PUCCH TPC-SRS-RNTI (Transmit Power Control for SRS RNTI): use for indicating a power adjustment command for an SRS In an embodiment, the aforementioned DCI formats may be defined as in [Table 11] below.

TABLE 11

| DCI Format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In 5G, a search space at an aggregation level L in a control resource set p and a search space set s may be represented as in the following equation.

$$L \cdot \left\{ \left( Y_{p,n_{s,f}^\mu} + \left\lfloor \frac{m_{s,n_{CI}} \cdot N_{CCE,p}}{L \cdot M_{p,s,max}^{(L)}} \right\rfloor + n_{CI} \right) \mod \lfloor N_{CCE,p}/L \rfloor \right\} + i \quad \text{[Equation 2]}$$

L: an aggregation level
nCI: a carrier index
NCCE,p: a total number of CCEs that are present within the control resource set p
nμs,f: a slot index
M(L)p,s,max: the number of PDCCH candidates at the aggregation level L
msnCI=0, . . . M(L)p,s,max−1: a PDCCH candidates index at the aggregation level L
i=0, . . . , L−1

$Y_{p,n_{s,f}}^\mu = A_p \cdot Y_{p,n_{s,f}^\mu - 1}) \mod D, Y_{p,-1} = n_{RNTI} \neq 0,$
$A_0 = 39827$ A₁=39829, A₂=39839, D=65537
nRNTI: a UE identity
Y_(p, nμs, f) value may correspond to 0 in the case of the common search space.
Y_(p, nμs, f) value may correspond to a value that varies depending on the identity (a C-RNTI or an ID configured for a UE by a base station) of a UE and a time index in the case of the UE-specific search space.

According to an embodiment of the present disclosure, in 5G, a plurality of search space sets may be configured as different parameters (e.g., parameters in [Table 10]). Accordingly, a set of search space sets that are monitored by a terminal every timing may be different. For example, if a search space set #1 is configured in an X-slot period and a search space set #2 is configured in a Y-slot period, when X and Y are different from each other, a terminal may monitor both the search space set #1 and the search space set #2 in a specific slot, and may monitor one of the search space set #1 and the search space set #2 in a specific slot.

Meanwhile, an NR system adopts an asynchronous HARQ method in which data retransmission timing has not been fixed with respect to an uplink/downlink HARQ. Downlink is described as an example, when a base station receives feedback for HARQ NACK from a terminal with respect to initial transmission data transmitted by the base station, the base station freely determines transmission timing for retransmission data by a scheduling operation. The terminal may buffer data that is determined to be an error as a result of the decoding of received data for a HARQ operation, and may perform combining with data retransmitted by the base station. HARQ ACK/NACK information of a PDSCH that is transmitted in a subframe n-k may be transmitted from the terminal to the base station through a PUCCH or the PUSCH in a subframe n. In the case of a 5G communication system such as NR, a k value is transmitted by being included in DCI that indicates or schedules the reception of the PDSCH transmitted in the subframe n-k, or the k value may be configured for the terminal through a higher signal. In this case, the base station may configure one or more k values through the higher signal, and may indicate a specific k value through the DCI. In this case, the k may be determined based on a HARQ-ACK processing ability of the terminal, in other words, a minimum time that is necessary for the terminal to receive the PDSCH and to generate and report HARQ-ACK for the PDSCH. Furthermore, the terminal may use a predefined value or a default value until the k value is configured for the terminal.

Next, a resource region in which a data channel is transmitted in a 5G communication system is described.

Figure 5:
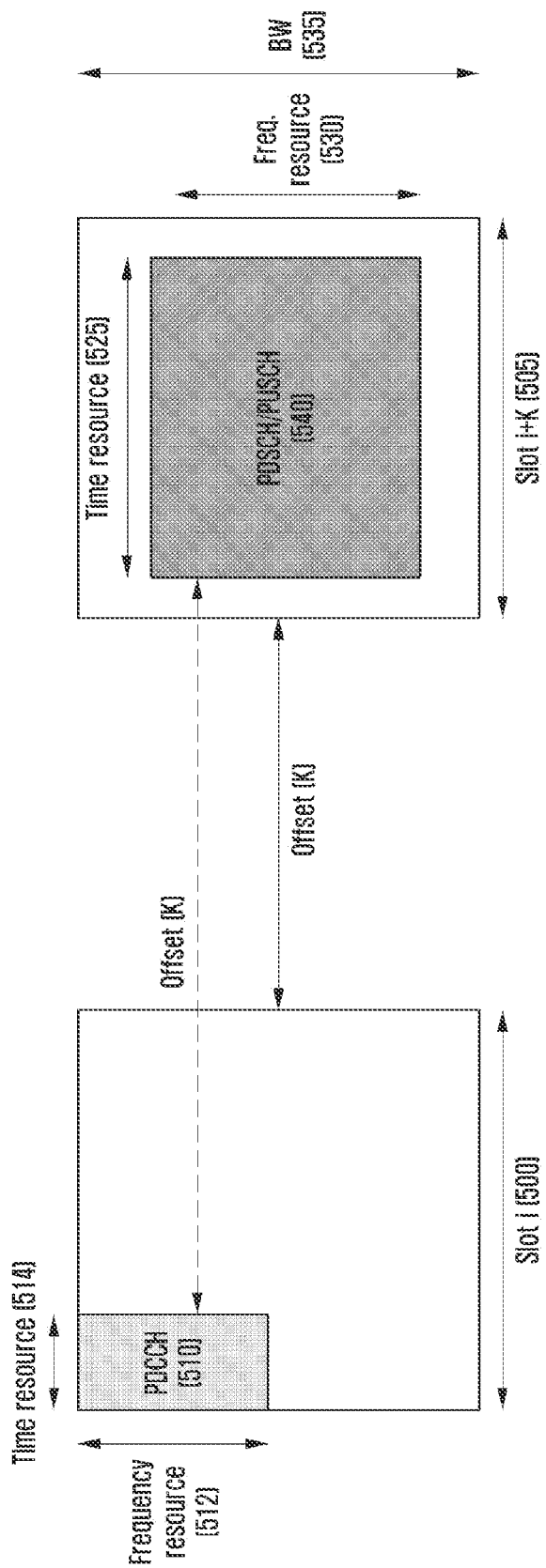
FIG. 5 is a diagram illustrating a resource region in which a data channel is transmitted in a 5G communication system according to an embodiment of the disclosure.

FIG. 5 is a diagram illustrating a resource region in which a data channel is transmitted in a 5G communication system.

A terminal monitors to searches for a PDCCH 510 in a downlink control channel (hereinafter a PDCCH) region (hereinafter a control resource set (CORESET) to a search space (SS)) that is configured through a higher signal from a base station. In this case, the CORESET is constituted with time region (514) and frequency region (512) information. The time region (514) information may be configured in a symbol unit, and the frequency region (512) information may be configured as an RB or in a group unit of an RB. If the terminal detects the PDCCH 510 in a slot i 500, the terminal obtains downlink control information (DCI) transmitted through the detected PDCCH 510. The terminal may obtain scheduling information for a downlink data channel or an uplink shared channel through the received DCI. In other words, the DCI may include information of a resource region (or a PDSCH transmission region) in which the terminal has to at least receive a physical downlink shared channel (hereinafter a PDSCH) from the base station, or information of a resource region assigned to the terminal from the base station for PUSCH transmission. A case in which the terminal is scheduled with PUSCH transmission is described below as an example. The terminal that has received the DCI may obtain a slot index or offset information K based on which the terminal has to receive the PUSCH through the DCI, and may determine a PUSCH transmission slot index. For example, the terminal may determine that it has been scheduled to transmit the PUSCH in a slot i+K 505 through the received offset information K on the basis of the slot index i 500 based on which the PDCCH 510 has been received. In this case, the terminal may also determine the slot i+K 505 or the start symbol or time of the PUSCH in the slot i+K through the received offset information K on the basis of a CORESET in which the PDCCH 510 has been received. Furthermore, the terminal may obtain information on a PUSCH transmission time-frequency resource region 540 in the PUSCH transmission slot 505 from the DCI. In this case, PUSCH transmission frequency resource region information 530 may be a PRB to group unit information of a PRB. Meanwhile, the PUSCH transmission frequency resource region information 530 is a region that is included in an initial uplink bandwidth (BW) 535 or initial uplink BWP 535 that has been determined by the terminal or configured for the terminal through an initial access procedure. If the terminal is configured with an uplink BW or an uplink BWP through a higher signal, the PUSCH transmission frequency resource region information 530 is a region that is included in the uplink BW or the uplink BWP configured for the terminal through the higher signal.

PUSCH transmission time resource region information 525 may be a symbol to group unit information of a symbol or may be information indicative of absolute time information. In this case, the PUSCH transmission time resource region information 525 may be represented as a combination of a PUSCH transmission start time or the length of a symbol and a PUSCH or a PUSCH end time or a symbol, and may be included in DCI as one field to value. In this case, the PUSCH transmission time resource region information 525 may be included in the DCI as a field to value that represents each of the PUSCH transmission start time or the length of the symbol and the PUSCH or the PUSCH end time or the symbol. The terminal may transmit the PUSCH in the PUSCH transmission resource region 540 determined through the DCI.

Hereinafter, a method of assigning a frequency domain resource for a data channel in a 5G communication system is described.

5G supports three types: a resource assignment type 0, a resource assignment type 1, and a resource assignment type 2 as a method of indicating frequency domain resource assignment information for a PDSCH and a PUSCH.

Resource Assignment Type 0

A base station may notify a terminal of RB assignment information in the form of a bitmap for a resource block group (RBG). In this case, the RBG may be constituted with a set of contiguous virtual RBs (VRBs). The size P of the RBG may be determined based on a value configured as a higher layer parameter (rbg-Size) and a size value of a BWP defined in the following table.

TABLE 12

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

A total number ($N_{RBG}$) of RBGs of a BWP i having a size of $N_{BWP,i}^{size}$ may be defined as follows.

$N_{RBG} = \lceil (N_{BWP,i}^{size} + (N_{BWP,i}^{start} \bmod P))/P \rceil$, where the size of the first RBG is $RBR_0^{size} = P - N_{BWP,i}^{start} \bmod P$, the size of the last RBG is $RBG_{last}^{size} = (N_{BWP,i}^{start} + N_{BWP,i}^{size}) \bmod P$ if $(N_{BWP,i}^{start} + N_{BWP,i}^{size}) \bmod P > 0$ and P otherwise, the size of all other RBGs is P.

Each of bits of the bitmap of the $N_{RBG}$ bit size may correspond to each RBG. RBGs may be assigned indices in the order in which a frequency is increased starting from the lowest frequency location of a BWP. An RBG #0 to an RBG #($N_{RBG}$−1) may be mapped to $N_{RBG}$ RBGs within the BWP from the MSB of the RBG bitmap to the LSB thereof. A terminal may determine that an RBG corresponding to a specific bit value has been assigned when the specific bit value within the bitmap is 1, and may determine that an RBG corresponding to a specific bit value has not been assigned when the specific bit value within the bitmap is 0.

Resource Assignment Type 1

A base station may notify a terminal of RB assignment information as information for the start location and length of contiguously assigned VRBs. In this case, interleaving or non-interleaving may be additionally applied to the contiguously assigned VRBs. A resource assignment field of the resource assignment type 1 may be constituted with a resource indication value (RIV). The RIV may be constituted with the start point ($RB_{start}$) of a VRB and the length ($L_{RBs}$) of contiguously assigned RBs. More specifically, the RIV within the BWP of the $N_{BWP}^{size}$ size may be defined below.

if $(L_{RBs}-1) \leq \lfloor N_{BWP}^{size}/2 \rfloor$ then $RIV = N_{BWP}^{size}(L_{RBs}-1) + RB_{start}$ else $RIV = N_{BWP}^{size}(N_{BWP}^{size} - L_{RBs}+1) + (N_{BWP}^{size}-1-RB_{start})$ where $L_{RBs}$ 1 and shall not exceed $N_{BWP}^{size} - RB_{start}$.

Resource Assignment Type 2

A base station may notify a terminal of RB assignment information as M interlace index sets.

An interlace index $m \in \{0, 1, \ldots, M-1\}$ may be constituted with common RBs $\{m, M+m, 2M+m, 3M=m, \ldots\}$, and M may be defined as in Table 8.

TABLE 13

| μ | M |
|---|---|
| 0 | 10 |
| 1 | 5 |

A relation between an interlace m and RB $n_{IRB,m}^\mu \in \{0, 1, \ldots\}$ in a BWP i and a common RB $n_{CRB}^\mu$ may be defined as follows.

$n_{CRB}^\mu = M n_{IRB,m}^\mu + N_{BWP,i}^{start,\mu} + ((m - N_{BWP,i}^{start,\mu}) \mod M)$ where $N_{BWP,i}^{start,\mu}$ is the common resource block where BWP starts relative to common resource block 0. u is subcarrier spacing index When a subcarrier spacing is 15 kHz (u=0), a base station may notify a terminal of RB assignment information for an interlace set as m0+1 indices. Furthermore, a resource assignment field may be constituted with a resource indication value (RIV). When the RIV is $0 \leq RIV < M(M+1)/2$, l=0, 1 ... L-1, the RIV may be constituted with a start interlace m0 and the number L (L≥1) of contiguous interlaces, and a value thereof is as follows.

if $(L-1) \leq \lfloor M/2 \rfloor$ then $RIV = M(L-1) + m_0$ else $RIV = M(M-L+1) + (M-1-m_0)$ When the RIV is RIV≥M(M+1)/2, the RIV is constituted with a start interlace index m0 and 1 values, and may be constituted as in Table 14.

TABLE 14

| RIV − M(M + 1)/2 | $m_0$ | l |
|---|---|---|
| 0 | 0 | {0, 5} |
| 1 | 0 | {0, 1, 5, 6} |
| 2 | 1 | {0, 5} |
| 3 | 1 | {0, 1, 2, 3, 5, 6, 7, 8} |
| 4 | 2 | {0, 5} |
| 5 | 2 | {0, 1, 2, 5, 6, 7} |
| 6 | 3 | {0, 5} |
| 7 | 4 | {0, 5} |

When a subcarrier spacing is 30 kHz (u=1), a base station may notify a terminal of RB assignment information in the form of a bitmap that indicates interlaces assigned to the terminal. The size of the bitmap is M, and one bit of the bitmap corresponds to each interlace. In the order of the interlace bitmap, interlace indices 0 to M−1 may be mapped to the MSB of the interlace bitmap to the LSB thereof.

Next, a method of configuring, by a base station, a beam for a terminal for control information and data transmission is described. In the disclosure, for convenience of description, a process of transmitting control information through a PDCCH may be represented as transmitting the PDCCH, and a process of transmitting data through a PDSCH may be represented as transmitting a PDSCH.

First, a beam configuration method for a PDCCH is handled in detail.

Figure 6:
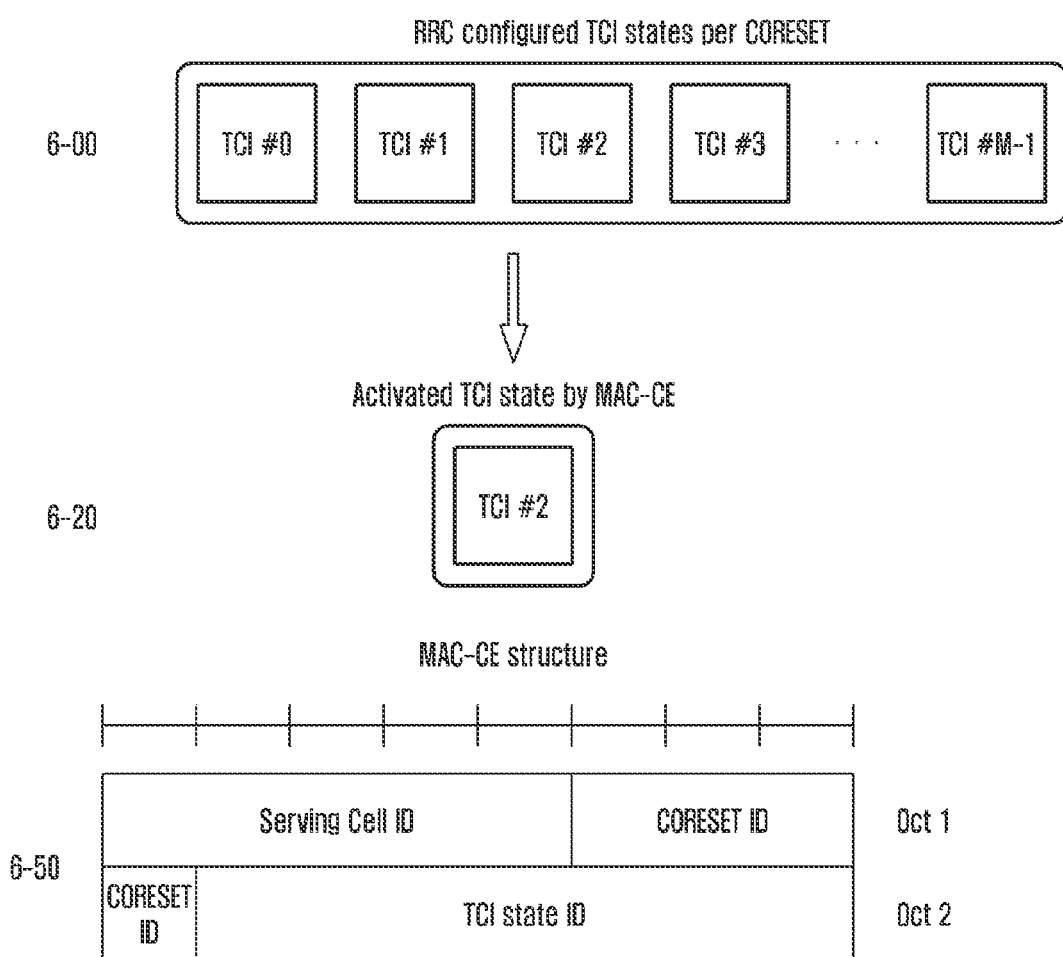
FIG. 6 is a diagram illustrating a process of configuring and activating a beam of a PDCCH according to an embodiment of the disclosure.

FIG. 6 illustrates a process of configuring and activating a beam of a PDCCH. First, a list of TCI states may be indicated through a higher layer list such as RRC for each CORESET (6-00). The list of TCI states may be indicated as a tci-statesPDCCH-ToAddList and/or a tci-statesPDCCH-ToReleaseList in [Table 8]. Next, one of the list of TCI states configured for each CORESET may be activated through a MAC-CE (6-20). (6-50) illustrates an example of a MAC-CE structure for the TCI state activation of a PDCCH. The meaning of each field within the MAC CE and a value which may be configured in each field are as follows.

Serving Cell ID: This field indicates the identity of the Serving Cell for which the MAC CE applies. The length of the field is 5 bits;
CORESET ID: This field indicates a Control Resource Set identified with ControlResourceSetId as specified in TS 38.331 [5], for which the TCI State is being indicated. In case the value of the field is 0, the field refers to the Control Resource Set configured by controlResourceSetZero as specified in TS 38.331 [5]. The length of the field is 4 bits;
TCI State ID: This field indicates the TCI state identified by TCI-StateId as specified in TS 38.331 [5] applicable to the Control Resource Set identified by CORESET ID field. If the field of CORESET ID is set to 0, this field indicates a TCI-StateId for a TCI state of the first 64 TCI-states configured by tci-States-ToAddModList and tci-States-ToReleaseList in the PDSCH-Config in the active BWP. If the field of CORESET ID is set to the other value than 0, this field indicates a TCI-StateId configured by tci-StatesPDCCH-ToAddList and tci-StatesPDCCH-ToReleaseList in the controlResourceSet identified by the indicated CORESET ID. The length of the field is 7 bits.

Next, a beam configuration method for a PDSCH is described.

Figure 7:
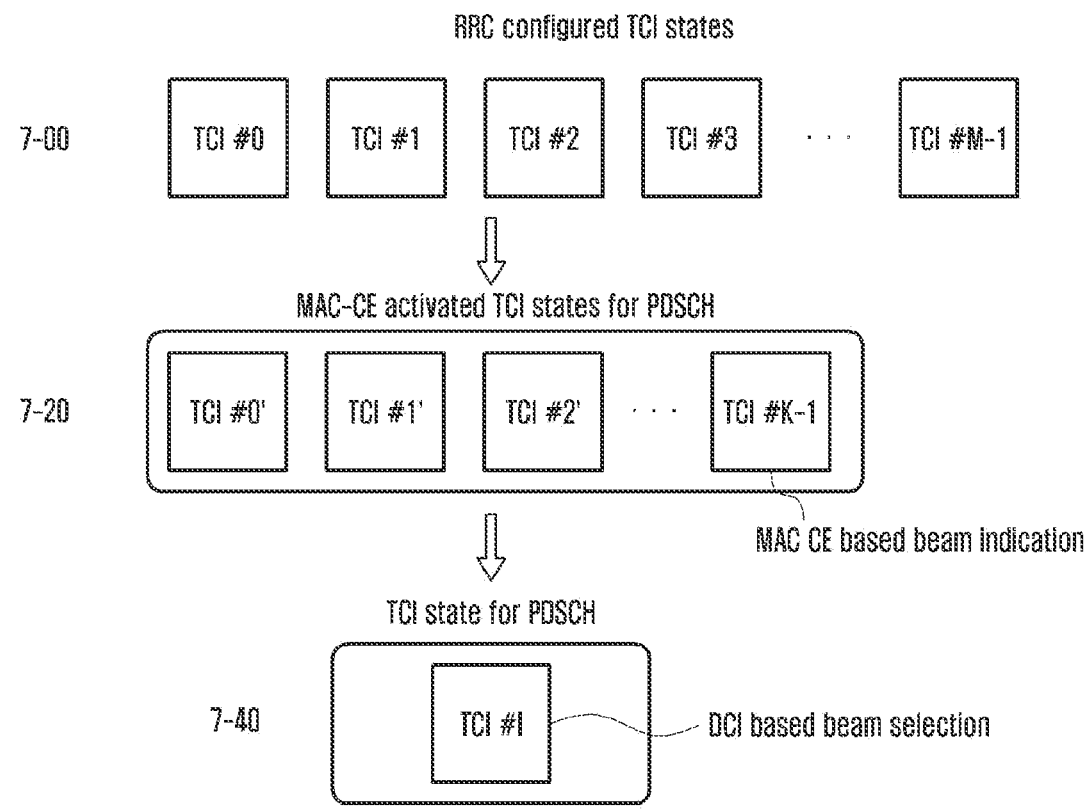
FIG. 7 is a diagram illustrating a process of configuring and activating a beam of a PDSCH according to an embodiment of the disclosure.
Figure 7:
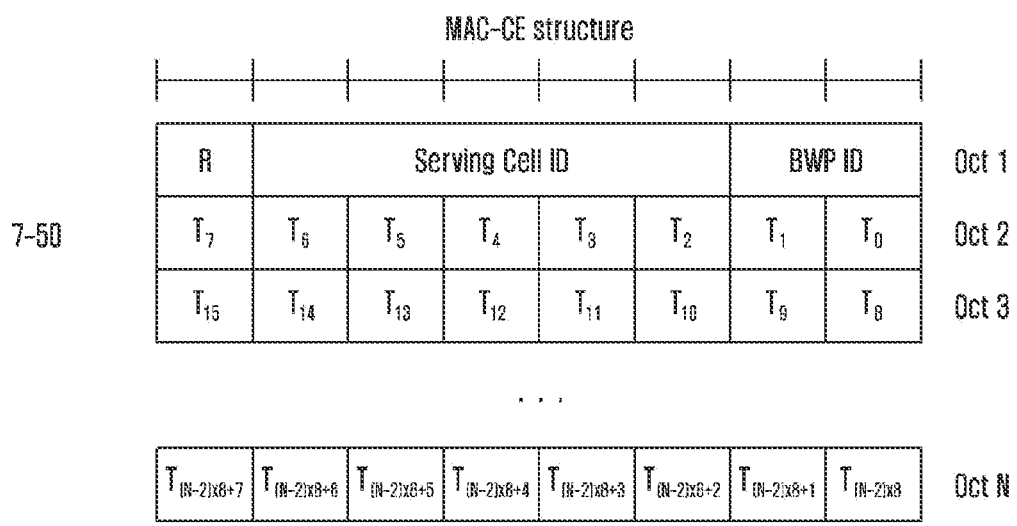

FIG. 7 illustrates a process of configuring and activating a beam of a PDSCH. A list of TCI states for a PDSCH may be indicated through a higher layer list such as RRC (7-00). The list of TCI states may be indicated as tci-StatesToAddModList and/or tci-StatesToReleaseList within a PDSCH-Config IE for each BWP, for example. Next, some of the list of TCI states may be activated through a MAC-CE (7-20). A maximum number of activated TCI states may be determined based on a capability that is reported by a terminal. (7-50) illustrates an example of a MAC-CE structure for the activation/deactivation of a TCI state of a Rel-15-based PDSCH.

The meaning of each field within the MAC CE and a value which may be configured in each field are as follows.

---

Serving Cell ID: This field indicates the identity of the Serving Cell for which the MAC CE applies. The length of the field is 5 bits;
BWP ID: This field indicates a DL BWP for which the MAC CE applies as the codepoint of the DCI bandwidth part indicator field as specified in TS 38.212 [9]. The length of the BWP ID field is 2 bits;
Ti: If there is a TCI state with TCI-StateId I as specified in TS 38.331 [5], this field indicates the activation/deactivation status of the TCI state with TCI-StateId I, otherwise MAC entity shall ignore the Ti field. The Ti field is set to 1 to indicate that the TCI state with TCI-StateId i shall be activated and mapped to the codepoint of the DCI Transmissino Configuration Indication field, as specified in TS 38.214 [7]. The Ti field is set to 0 to indicate that the TCI state with TCI-StateId I shall be deactivated and is not mapped to the codepoint of the DCI Transmissino Configuratino Indication field. The codepoint to which the TCI State is mapped is determined by its ordinal position among all the TCI States with Ti field set to 1, i.e. the first TCI State with Ti field set to 1 shall be mapped to the codepoint value 0, second TCI State with Ti field set to 1 shall be mapped to the codepoint value 1 and so on. The maximum number of activated TCI states is 8;
R: Reserved bit, set to 0.

---

When receiving the DCI format 1_1 or the DCI format 1_2, a terminal may receive a PDSCH through one beam of TCI states activated by the MAC-CE, based on information of a transmission configuration indication (TCI) field within DCI (7-40). Whether the TCI field is present is determined by a tci-PresentinDCI value, that is, a higher layer parameter within a CORESET configured for the reception of the DCI. If tci-PresentinDCI is configured as "enabled" in the higher layer, the terminal may determine TCI states activated in a DL BWP or a scheduled component carrier and the direction of a beam associated with a DL-RS by identifying a TCI field of 3-bit information.

In LTE and NR, a terminal has a procedure of reporting, to a corresponding base station, a capability supported by the terminal in the state in which the terminal has been connected to a serving base station. This is denoted as a UE capability (report) in the following description. The base station may transmit, to the terminal in the connected state, a UE capability enquiry message that requests a capability report. The message may include a UE capability request for each RAT type by the base station. The request for each RAT type may include frequency band information that is requested. Furthermore, the UE capability enquiry message may request a plurality of RAT types in one RRC message container or the UE capability enquiry message including a request for each RAT type may be included plural times and transmitted to the terminal. That is, a UE capability enquiry may be repeated plural times, and the terminal may constitute a UE capability information message corresponding to the UE capability enquiry and report the UE capability information message plural times. In a next-generation mobile communication system, a UE capability request for MR-DC in addition to NR, LTE, and EN-DC may be made. For reference, in general, the UE capability enquiry message is initially transmitted after a terminal is connected, but may be requested even when a base station requires the UE capability enquiry message.

In the step, the terminal that has received the UE capability report request from the base station constitutes a UE capability based on RAT type and band information requested by the base station. A method of constructing, by the terminal, the UE capability in an NR system is arranged below.

1. If the terminal is provided with a list of LTE and/or NR bands as a UE capability request from the base station, the terminal constitutes a band combination (BC) for EN-DC and NR stand alone (SA). That is, the terminal constitutes a candidate list of BCs for EN-DC and NR SA based on bands that have been requested from the base station as FreqBandList. Furthermore, the bands have priorities in an order written in FreqBandList.

2. If the base station sets an "eutra-nr-only" flag or an "eutra" flag and requests a UE capability report, the terminal completely removes NR SA BCs from a candidate list of the constituted BCs. Such an operation may occur only when an LTE base station (eNB) requests an "eutra" capability.

3. Thereafter, the terminal removes fallback BCs from the candidate list of BCs constituted in the above step. In this case, a fallback BC corresponds to a case in which a band corresponding to at least one SCell has been removed from which super set BC, and may be omitted because the super set BC may already cover the fallback BC. This step is also applied to MR-DC. That is, this step is also applied to LTE bands. BCs that remain after this step are the final "candidate BC list."

4. The terminal selects BCs suitable for a requested RAT type from the final "candidate BC list", and selects BCs to be reported. In this step, the terminal constitutes supportedBandCombinationList in a determined order. That is, the terminal constitutes a BC and UE capability to be reported based on the order of previously configured rat-Types (nr→eutra-nr→eutra). Furthermore, the terminal constitutes featureSetCombination for the constituted supportedBandCombinationList, and constitutes a list of "candidate feature set combinations" in a candidate BC list from which a list of fallback BCs (including a capability having the same or lower step) has been removed. The "candidate feature set combination" includes all feature set combinations for NR and EUTRA-NR BC, and may be obtained from a feature set combination of UE-NR-Capabilities and UE-MRDC-Capabilities container.

5. Furthermore, if a requested rat Type is eutra-nr and has an influence, featureSetCombinations is fully included two containers of UE-MRDC-Capabilities and UE-NR-Capabilities. However, a feature set of NW includes only UE-NR-Capabilities.

After the UE capability is constituted, the terminal transmits, to the base station, a UE capability information message including the UE capability. The base station subsequently performs scheduling, transmission, and reception management suitable for the terminal based on the UE capability received from the terminal.

Meanwhile, if an interval between a symbol in which the transmission of a PDCCH is ended and the start symbol of a PDSCH scheduled by the PDCCH is less than a specific threshold, the terminal may not complete the decoding of the PDCCH at timing at which the PDSCH is received. This means that beam information indicated in the DCI of the PDCCH is not received for the PDSCH reception. In the situation, the base station and the terminal may designate a basic beam for the PDSCH reception. That is, in the situation, the base station transmits the PDSCH through the designated basic beam, and the terminal performs buffering through the designated basic beam. If the terminal has determined that a scheduled PDSCH is present at timing prior to the PDCCH decoding after the PDCCH decoding, the terminal may perform the PDSCH decoding from a buffered signal based on a basic beam. In this case, the aforementioned threshold may be a timeDurationForQCL value that is reported as the UE capability. Meanwhile, the basic beam operation may be limited to a case in which one or more TCI states of the TCI state list 7-00 configured for the PDSCH include QCL-TypeD, that is, a case in which a reception beam configuration of the terminal is accompanied. In this case, a basic beam may be a beam that has been configured in a CORESET (e.g., CORESET #0) corresponding to the lowest ID among CORESETs corresponding to a monitored search space of the most recent slot on the basis of a PDSCH reception slot.

A basic beam operation for the PDSCH reception may be limited to a case in which a cross-carrier configuration for a PDSCH has not been performed.

Figure 8:
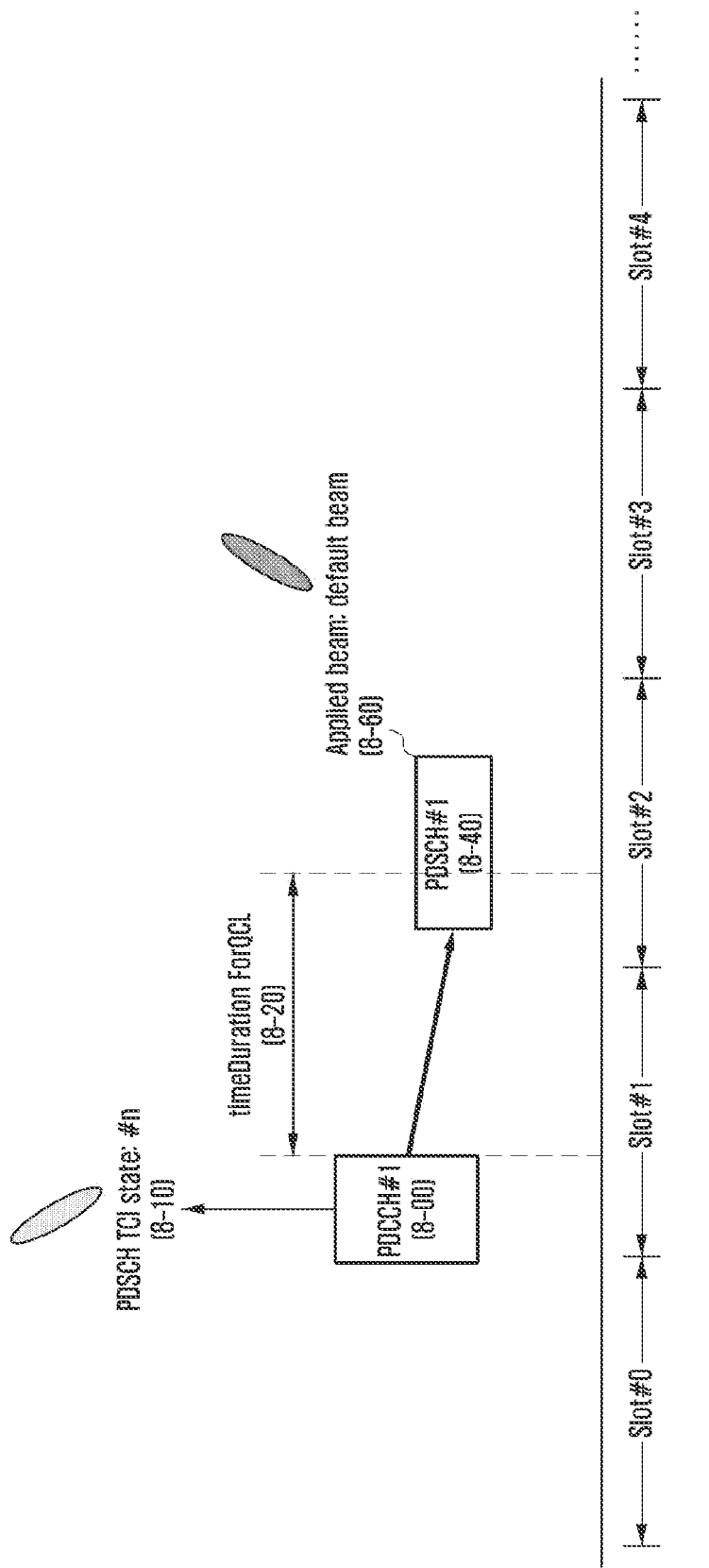
FIG. 8 is a diagram illustrating an example of a PDSCH basic bean operation according to an embodiment of the disclosure.

FIG. 8 illustrates an example of the PDSCH basic beam operation. When a TCI field for PDSCH reception indicates a TCI state #n 8-10 within DCI 8-00 transmitted through a PDCCH, if an interval between a symbol at which the transmission of the PDCCH is ended and the start symbol of a PDSCH 8-40 scheduled by the PDCCH is shorter than timeDurationforQCL 8-20 and one or more TCI states of a TCI state list configured through RRC for the PDSCH includes QCL-TypeD, a basic beam 8-60 is applied to the PDSCH.

Meanwhile, if the parameter tci-PresentinDCI is not configured within a CORESET or the PDSCH is scheduled as the DCI format 1_0, a terminal does not receive indication for a beam for PDSCH reception because a TCI field is not present within DCI. In this case, when the interval between the symbol at which the transmission of the PDCCH is ended and the start symbol of the PDSCH scheduled by the PDCCH is equal to or greater than the timeDurationForQCL value, the terminal assumes that the beam for the PDSCH reception is the same as a beam configured/activated in a PDCCH transmission CORESET. A base station may configure a PDSCH transmission beam based on the assumption of the terminal. A basic beam operation for the PDSCH reception may be limited if a cross-carrier configuration for the PDSCH is not performed.

In NR, if a base station schedules a PDSCH for a terminal by using the DCI format 1_0 or the DCI format 1_1, the terminal may transmit HARQ-ACK feedback information for the PDSCH to the base station through a PUCCH. The base station indicates, for the terminal, a slot to which a PUCCH in which HARQ-ACK feedback information is transmitted is mapped through DCI that schedules the PDSCH, and the type of PUCCH resource. Specifically, the base station may indicate a slot offset between a PDSCH and a PUCCH in which HARQ-ACK feedback information is transmitted through a PDSCH-to-HARQ_feedback timing indicator field of DCI that schedules the PDSCH. Furthermore, the base station may indicate the type of PUCCH resource in which HARQ-ACK feedback information is transmitted through a PUCCH resource indicator of DCI that schedules a PDSCH.

When a PDSCH is scheduled based on DCI information of a PDCCH, slot information to which a PUCCH in which the PDSCH is transmitted and that includes HARQ-ACK feedback corresponding to the PDSCH is mapped and symbol mapping information within the slot of the PUCCH including the HARQ-ACK feedback are transferred. Specifically, a slot interval K2 between the PDSCH and the HARQ-ACK feedback corresponding to the PDSCH is indicated through a PDSCH-to-HARQ_feedback timing indicator. One of eight types of feedback timing offsets that have been configured through higher layer signaling or that have been previously determined from 1 to 8 is indicated as a candidate value of the slot interval. Furthermore, in order to transmit a PUCCH-format to which HARQ-ACK feedback information will be mapped, the location of a start symbol, or a PUCCH resource including the number of mapping symbols, one of eight types of resources configured through a higher layer is indicated through a PUCCH resource indicator. A terminal determines the time domain mapping location of a PUCCH including HARQ-ACK feedback, with reference to a slot interval between a PDSCH and the HARQ-ACK feedback corresponding to the PDSCH and the location of a start symbol configured in a PUCCH resource and the number of mapping symbols. Furthermore, the terminal maps HARQ-ACK feedback information based on a PUCCH-format configured in the PUCCH resource.

A spatial domain transmission filter of a terminal that transmits a PUCCH complies with spatial relation info of a PUCCH that is activated through higher layer signaling including a MAC CE in the PUCCH resource of the terminal. If activated spatial relation info of the PUCCH resource refers to the index of a CSI-reference signal (RS) resource or synchronization/broadcast channel block (SS/PBCH block, SSB), the terminal may transmit the PUCCH by using a spatial domain transmission filter, such as a spatial domain reception filter that is used to receive a referred CSI-RS resource or SSB. Alternatively, if the activated spatial relation info of the PUCCH resource refers to a sounding reference signal (SRS) resource index, the terminal may transmit the PUCCH by using a spatial domain transmission filter that has been used to transmit a referred SRS resource. The aforementioned configuration may include information, such as [Table 15].

TABLE 15

```
PUCCH-SpatialRelationInfo ::=      SEQUENCE {
    pucch-SpatialRelationInfoId         PUCCH-SpatialRelationInfoId,
    servingCellId                       ServCellIndex
    OPTIONAL, -- Need S
    referenceSignal                     CHOICE {
        ssb-Index                           SSB-Index,
        csi-RS-Index                        NZP-CSI-RS-ResourceId,
        srs                                 SEQUENCE {
                                                resource       SRS-ResourceId,
                                                uplinkBWP      BWP-Id
                                            }
    },
    pucch-PathlossReferenceRS-Id        PUCCH-PathlossReferenceRS-Id,
    p0-PUCCH-Id                         P0-PUCCH-Id,
    closedLoopIndex                     ENUMERATED { i0, i1 }
}
PUCCH-SpatialRelationInfoId ::=    INTEGER (1..maxNrofSpatialRelationInfos)
-- TAG-PUCCH-SPATIALRELATIONINFO-STOP
-- ASN1STOP
```

Next, a method of estimating, by a terminal, an uplink channel using the transmission of a sounding reference signal (SRS) is described. A base station may configure at least one SRS configuration for every uplink BWP in order to transmit configuration information for SRS transmission to a terminal, and may configure at least one SRS resource set for every SRS configuration. For example, the base station and the terminal may exchange the following signaling information in order to transmit information relating to an SRS resource set.
- srs-ResourceSetId: the index of an SRS resource set
- srs-ResourceIdList: a set of SRS resource indices to which reference is made in an SRS resource set
- resourceType: this is a time domain transmission configuration of an SRS resource to which reference is made in an SRS resource set, and may have one of "periodic", "semi-persistent", or "aperiodic." If resourceType is configured as "periodic" or "semi-persistent", associated CSI-RS information may be provided depending on the usage of an SRS resource set. If resourceType is configured as "aperiodic", an aperiodic SRS resource trigger list and slot offset information may be provided. Associated CSI-RS information may be provided depending on the usage of an SRS resource set.
- Usage: this is a configuration for the usage of an SRS resource to which reference is made in an SRS resource set, and may have one of "beamManagement", "codebook", "nonCodebook", or "antennaSwitching."
- alpha, p0, pathlossReferenceRS, srs-PowerControlAdjustmentStates: this provides a parameter configuration for adjusting transmission power of an SRS resource to which reference is made in an SRS resource set.

A terminal may understand that an SRS resource included in an SRS resource index to which reference is made in an SRS resource set complies with information configured in the SRS resource set.

Furthermore, a base station and a terminal may exchange higher layer signaling information in order to transmit individual configuration information for an SRS resource. For example, individual configuration information for an SRS resource may include time-frequency domain mapping information within a slot of the SRS resource. The time-frequency domain mapping information may include information on frequency hopping within a slot of the SRS resource between slots thereof. Furthermore, for example, individual configuration information for an SRS resource may include a time domain transmission configuration of the SRS resource, and may have one of "periodic", "semi-persistent", or "aperiodic." This may be limited to have a time domain transmission configuration, such as an SRS resource set included in an SRS resource. If a time domain transmission configuration of an SRS resource is configured as "periodic" or "semi-persistent", additionally, the time domain transmission configuration may include SRS resource transmission periodicity and a slot offset (e.g., periodicityAndOffset). A base station may activate, deactivate, or trigger SRS transmission for a terminal through higher layer signaling including RRC signaling or MAC CE signaling, or L1 signaling (e.g., DCI).

For example, a base station may activate or deactivate periodic SRS transmission for a terminal through higher layer signaling. The base station may indicate to activate an SRS resource set in which resourceType has been periodically configured through higher layer signaling. The terminal may transmit an SRS resource with reference to the activated SRS resource set. Time-frequency domain resource mapping within a slot of the transmitting SRS resource complies with resource mapping information configured in the SRS resource. Slot mapping including transmission periodicity and a slot offset complies with periodicityAndOffset configured in the SRS resource. Furthermore, a spatial domain transmission filter that is applied to the transmitting SRS resource may refer to spatial relation info configured in the SRS resource or may refer to associated CSI-RS information configured in an SRS resource set including the SRS resource. The terminal may transmit the SRS resource within an activated uplink BWP with respect to an activated periodic SRS resource through higher layer signaling.

For example, a base station may activate or deactivate semi-persistent SRS transmission for a terminal through higher layer signaling. The base station may indicate to activate an SRS resource set through MAC CE signaling. The terminal may transmit SRS resource that refers to the activated SRS resource set. The SRS resource set activated through the MAC CE signaling may be limited to an SRS resource set whose resourceType has been configured to be semi-persistent. Time-frequency domain resource mapping within a slot of the transmitting SRS resource complies with resource mapping information configured in the SRS resource. Slot mapping including transmission periodicity and a slot offset complies with periodicityAndOffset configured in the SRS resource. Furthermore, a spatial domain transmission filter applied to the transmitting SRS resource may refer to spatial relation info configured in the SRS resource or may refer to associated CSI-RS information configured in the SRS resource set including the SRS resource. If spatial relation info has been configured in the SRS resource, the spatial domain transmission filter may be determined with reference to configuration information for spatial relation info transmitted through MAC CE signaling that activates semi-persistent SRS transmission without complying with the spatial relation info. The terminal may transmit the SRS resource within an uplink BWP activated with respect to a semi-persistent SRS resource activated through higher layer signaling.

For example, a base station may trigger aperiodic SRS transmission for a terminal through DCI. The base station may indicate one of aperiodic SRS resource triggers through an SRS request field of the DCI. The terminal may understand that among configuration information of an SRS resource set, an SRS resource set including an aperiodic SRS resource trigger indicated through the DCI within an aperiodic SRS resource trigger list has been triggered. The terminal may transmit an SRS resource that is referred in the triggered SRS resource set. Time-frequency domain resource mapping within a slot of the transmitting SRS resource complies with resource mapping information configured in the SRS resource. Furthermore, slot mapping of the transmitting SRS resource may be determined through a slot offset between a PDCCH including the DCI and the SRS resource. This may refer to a value(s) included in a slot offset set configured in the SRS resource set. Specifically, the slot offset between the PDCCH including the DCI and the SRS resource may apply a value indicated in a time region resource assignment field of the DCI in an offset value(s) included in the slot offset set configured in the SRS resource set. Furthermore, a spatial domain transmission filter applied to the transmitting SRS resource may refer to spatial relation info configured in the SRS resource or may refer to associated CSI-RS information configured in the SRS resource set including the SRS resource. The terminal may transmit the SRS resource within an uplink BWP activated with respect to an aperiodic SRS resource triggered through the DCI.

If a base station triggers aperiodic SRS transmission for a terminal through DCI, in order to transmit an SRS by applying configuration information for an SRS resource, the terminal may require a minimum time interval between a PDCCH including the DCI that triggers the aperiodic SRS transmission and the transmitting SRS. The time interval for the SRS transmission of the terminal may be defined as the number of symbols between the last symbol of the PDCCH including the DCI that triggers the aperiodic SRS transmission and the first symbol to which an SRS resource first transmitted among a transmitting SRS resource(s) has been mapped. The minimum time interval may be determined with reference to a PUSCH preparation procedure time that is necessary for the terminal to prepare PUSCH transmission. Furthermore, the minimum time interval may have a different value depending on the usage of an SRS resource set including the transmitting SRS resource. For example, the minimum time interval may be determined as an $N_2$ symbol that is defined by taking into consideration a terminal processing ability according to the UE capability with reference to the PUSCH preparation procedure time of the terminal. Furthermore, if the usage of an SRS resource set has been configured as "codebook" or "antennaSwitching" by taking into consideration the usage of the SRS resource set including the transmitting SRS resource, the minimum time interval may be defined as an $N_2$ symbol. If the usage of the SRS resource set has been configured as "nonCodebook" or "beamManagement", the minimum time interval may be determined as an $N_2+14$ symbol. The terminal may transmit an aperiodic SRS when a time interval for aperiodic SRS transmission is greater than or equal to the minimum time interval, and may neglect DCI that triggers an aperiodic SRS when the time interval for the aperiodic SRS transmission is smaller than the minimum time interval.

TABLE 16

```
SRS-Resource ::=                    SEQUENCE {
    srs-ResourceId                      SRS-ResourceId,
    nrofSRS-Ports                       ENUMERATED {port1, ports2, ports4},
    ptrs-PortIndex                      ENUMERATED {n0, n1 }
OPTIONAL, -- Need R
    transmissionComb                    CHOICE {
        n2                                  SEQUENCE {
            combOffset-n2                       INTEGER (0..1),
            cyclicShift-n2                      INTEGER (0..7)
        },
        n4                                  SEQUENCE {
            combOffset-n4                       INTEGER (0..3),
            cyclicShift-n4                      INTEGER (0..11)
        }
    },
    resourceMapping                     SEQUENCE {
        startPosition                       INTEGER (0..5),
        nrofSymbols                         ENUMERATED {n1, n2, n4},
        repetitionFactor                    ENUMERATED {n1, n2, n4}
    },
    freqDomainPosition                  INTEGER (0..67),
    freqDomainShift                     INTEGER (0..268),
    freqHopping                         SEQUENCE {
        c-SRS                               INTEGER (0..63),
        b-SRS                               INTEGER (0..3),
        b-hop                               INTEGER (0..3)
    },
    groupOrSequenceHopping              ENUMERATED { neither, groupHopping, sequenceHopping },
    resourceType                        CHOICE {
        aperiodic                           SEQUENCE {
            ...
        },
        semi-persistent                     SEQUENCE {
            periodicityAndOffset-sp             SRS-PeriodicityAndOffset,
            ...
        },
        periodic                            SEQUENCE {
            periodicityAndOffset-p              SRS-PeriodicityAndOffset,
            ...
        }
    },
    sequenceId                          INTEGER (0..1023),
    spatialRelationInfo                 SRS-SpatialRelationInfo
OPTIONAL, -- Need R
    ...
}
``` spatialRelationInfo configuration information in [Table 16] may be applied to a beam that is used in corresponding SRS transmission by using beam information of one reference signal with reference to the corresponding reference signal. For example, a configuration of spatialRelationInfo may include information, such as [Table 17] below.

TABLE 17

```
SRS-SpatialRelationInfo ::= SEQUENCE {
    servingCellId           ServCellIndex   OPTIONAL,   -- Need S
    referenceSignal         CHOICE {
```

TABLE 17-continued

```
ssb-Index            SSB-Index,
csi-RS-Index         NZP-CSI-RS-ResourceId,
srs                  SEQUENCE {
   resourceId           SRS-ResourceId,
   uplinkBWP            BWP-Id
   }
 }
}
```

Referring to the spatialRelationInfo configuration, in order to use beam information of a specific reference signal, the index of a reference signal to be referred, that is, an SS/PBCH block index, a CSI-RS index, or an SRS index may be configured. Higher signaling referenceSignal is configuration information indicating that beam information of which reference signal will be referred for corresponding SRS transmission. ssb-Index means the index of an SS/PBCH block, csi-RS-Index means the index of a CSI-RS, and srs means the index of an SRS. If a value of the higher signaling referenceSignal is configured as "ssb-Index," a terminal may apply, as a transmission beam of corresponding SRS transmission, a reception beam that has been used when receiving an SS/PBCH block corresponding to ssb-Index. If a value of the higher signaling referenceSignal is configured as "csi-RS-Index", the terminal may apply, as a transmission beam of corresponding SRS transmission, a reception beam that has been used to when receiving a CSI-RS corresponding to csi-RS-Index. If a value of the higher signaling referenceSignal is configured as "srs", the terminal may apply, as a transmission beam of corresponding SRS transmission, a transmission beam that has been used when transmitting an SRS corresponding to srs.

An NR communication system may transmit an uplink signal (a configured grant PUSCH or a CG-PUSCH) without uplink scheduling information in order to provide various services and support a high data transfer rate. More specifically, if an uplink signal is to be transmitted without uplink scheduling information, information of resource assignment for uplink transmission, MCS, etc. may be configured through RRC signaling or DCI of a PDCCH. Uplink transmission which may be performed may be described by being divided into at least the following type depending on a method of receiving an uplink transmission configuration.

Type 1: an uplink transmission configuration using RRC signaling
Type 2: an uplink transmission configuration using a PDCCH of a physical layer In Type 1, a base station may configure, for a terminal, a specific time/frequency resource that grants non-grant-based PUSCH transmission through higher layer signaling, for example, RRC signaling. Furthermore, the base station may configure, for the terminal, various parameters (e.g., frequency hopping, a DMRS configuration, an MCS table, an MCS, an RBG size, a repetitive transmission number, or an RV) for PUSCH transmission through higher layer signaling. When receiving configuration information for Type 1 PUSCH transmission from the base station, the terminal may transmit a PUSCH through a periodically configured resource without the grant of the base station. All of the various parameters (e.g., frequency hopping, a DMRS configuration, an MCS, an RBG size, a repetitive transmission number, an RV, the number of precoding layers, an antenna port, and a frequency hopping offset) necessary to transmit the PUSCH may comply with a notified configuration value of the base station.

In Type 2, a base station may configure, for a terminal, some (e.g., period information) of information for a specific time/frequency resource that grants non-grant-based PUSCH transmission through higher layer signaling (e.g., RRC signaling). Furthermore, the base station may configure, for the terminal, various parameters (e.g., frequency hopping, a DMRS configuration, an MCS table, the size of a resource block group (RBG), a repetitive transmission number, and a redundancy version (RV)) for PUSCH transmission through higher layer signaling. The base station may transmit, to the terminal, DCI (validation DCI) constituted with a specific DCI field for the purpose of the scheduling activation or scheduling release of a Type 2 CG-PUSCH. More specifically, the base station may configure a CS-RNTI for the terminal. The terminal may monitor a DCI format with CRC scrambled by a CS-RNTI. If the CRS of a DCI format received by the terminal has been scrambled by a CS-RNTI and a new data indication value included in corresponding DCI is 0, the terminal may determine that the corresponding DCI is for the validation of DCI (validation DCI) for the scheduling activation or scheduling release of a Type 2 CG-PUSCH. When the validation of Type 2 CG-PUSCH transmission is completed, the terminal may determine whether Type 2 CG-PUSCH transmission is activated or released on the basis of a specific field value of the corresponding DCI. For example, if a specific field value has a value, such as Table 10, according to a DCI format, the terminal may determine that the Type 2 CG-PUSCH is activated. Furthermore, for example, if a special field value has a value, such as Table 19, according to a DCI format, the terminal may determine that the Type 2 CG-PUSCH has been released.

TABLE 18

|  | DCI format 0_0/0_1 | DCI format 1_0 | DCI format 1_1 |
| --- | --- | --- | --- |
| HARQ process number | set to all '0's | set to all '0's | set to all '0's |
| Redundancy version | set to '00' | set to '00' | For the enabled transport block: set to '00' |

TABLE 19

|  | DCI format 0_0 | DCI format 1_0 |
| --- | --- | --- |
| HARQ process number | set to all '0's | set to all '0's |
| Redundancy version | set to '00' | set to '00' |
| Modulation and coding scheme | set to all '1's | set to all '1's |
| Frequency domain resource assignment | set to all '1's | set to all '1's |

Figure 9:
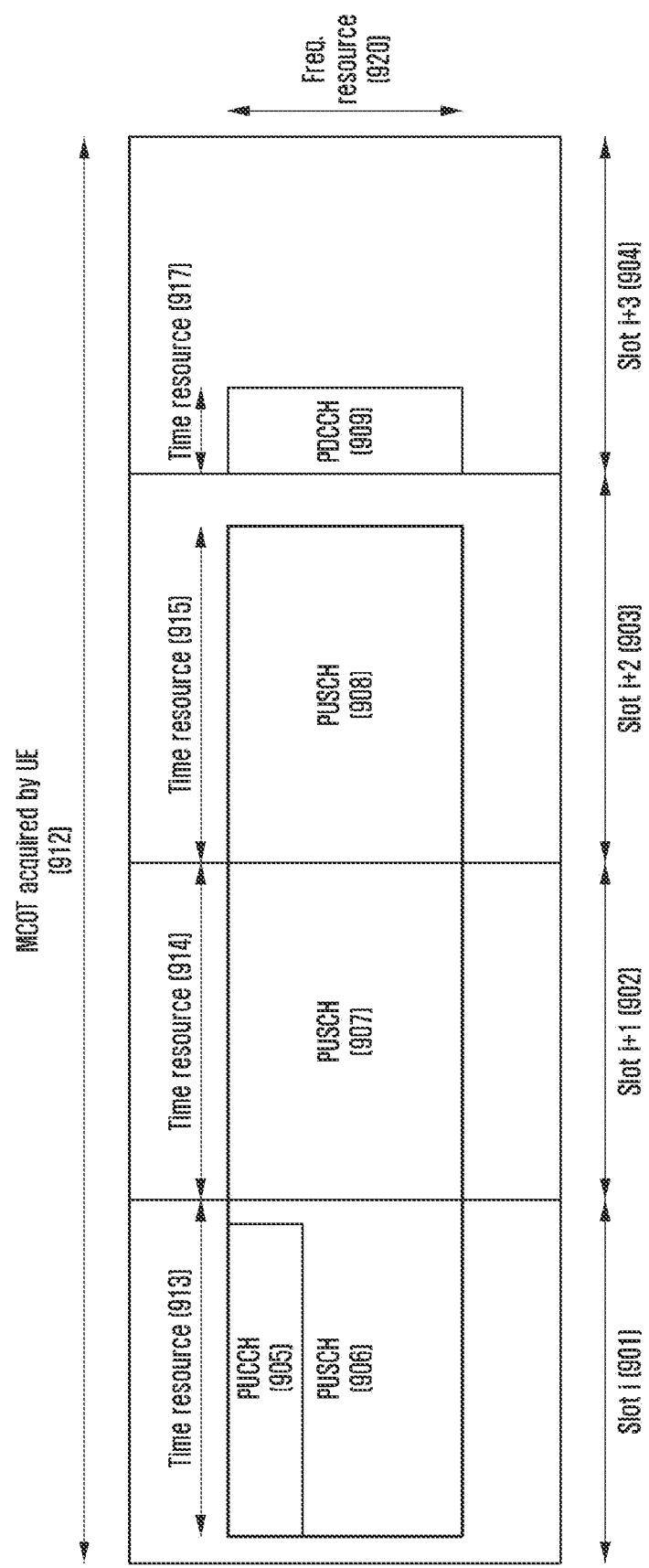
FIG. 9 is a diagram illustrating a case in which an uplink signal is transmitted without uplink scheduling information in an unlicensed band according to an embodiment of the disclosure.

FIG. 9 is a diagram illustrating a case in which an uplink signal is transmitted without uplink scheduling information in an unlicensed band.

In an unlicensed band, a channel access procedure is performed in order to transmit an uplink signal without uplink scheduling information. In this case, if a terminal accesses the unlicensed band by performing the channel access procedure for a variable time, the terminal may schedule downlink transmission 909 in the last slot 904 or the last subframe 904 within a maximum channel occupancy time 912 through a channel occupancy time shared indicator of uplink control information 905. In this case, a base station may determine channel access by performing a channel access procedure for a fixed time. The terminal may configure the last one symbol of a slot 903 or subframe 903 for uplink transmission as a gap interval that is emptied for the channel access procedure of the base station. Upon CG-PUSCH transmission in the unlicensed band, the terminal may transmit the CG-PUSCH by including, in the CG-PUSCH, CG uplink control information (UCI) including a HARQ ID, RV, CG-PUSCH scheduling information, etc. of the CG-PUSCH. In this case, all CG-PUSCHs may include at least one CG-UCI.

In the case of a system that performs communication in an unlicensed band, a transmission device (a base station or a terminal) that attempts to transmit a signal through the unlicensed band may perform a channel access procedure (or a listen-before talk (LBT)) on the unlicensed band through which communication is to be performed before transmitting the signal, and may perform the signal transmission by accessing the unlicensed band when it is determined that the unlicensed band is in an idle state according to the channel access procedure. If it is determined that the unlicensed band is not in the idle state according to the executed channel access procedure, the transmission device does not perform the signal transmission.

In general, in the channel access procedure in the unlicensed band, the idle state of the unlicensed band may be determined by measuring, by the transmission device, the intensity of a signal received through the unlicensed band for a fixed time or for a time (e.g., a time calculated through one random value selected by at least base station or terminal) calculated according to a predefined rule and comparing the measured intensity with a threshold that is previously defined or that is calculated by a function for determining the size of the intensity of a received signal constituted with at least one variable among a channel bandwidth, the bandwidth of a signal in which a signal to be transmitted is transmitted, and the intensity of transmission power.

For example, a transmission device may measure the intensity of a signal for X us (e.g., 25 us) right before the time when the transmission device attempts to transmit the signal, may determine that an unlicensed band is in the idle state when the measured intensity of the signal is smaller than a threshold T (e.g., −72 dBm) that is previously defined or calculated, and may transmit a configured signal. In this case, after a channel access procedure, a maximum time capable of contiguous signal transmission may be limited based on a maximum channel occupancy time that is defined for each country, area, or frequency band depending on each unlicensed band, and may be limited depending on the type of transmission device (e.g., a base station or a terminal, or a master device or a slave device). For example, in the case of Japan, in a 5 GHz unlicensed band, a base station or a terminal may perform a channel access procedure, and may then transmit a signal by occupying a channel without performing an additional channel access procedure for a maximum of 4 ms time with respect to an unlicensed band that is determined to be in the idle state.

More specifically, when a base station or a terminal attempts to transmit a downlink or uplink signal in an unlicensed band, a channel access procedure which may be performed by the base station or the terminal may be described by dividing the channel access procedure into at least the following types.

Type 1: the transmission of an uplink/downlink signal after a channel access procedure for a variable time Type 2: the transmission of an uplink/downlink signal after performing a channel access procedure for a fixed time Type 3: the transmission of a downlink or uplink signal without performing a channel access procedure Hereinafter, in the disclosure, a case in which a base station transmits a downlink signal to a terminal through an unlicensed band and a case in which a terminal transmits an uplink signal to a base station through an unlicensed band are mixed and described. However, in the disclosure, if contents proposed with respect to any one of the two cases are different, that is, the contents may be identically applied to a case in which a base station transmits a downlink signal to a terminal through an unlicensed band and a case in which a terminal transmits an uplink signal to a base station through an unlicensed band or may be partially modified and applied thereto. Accordingly, a detailed description of downlink signal transmission and reception is omitted. Furthermore, in the disclosure, a case in which one downlink data information (a codeword or TB) or uplink data information is transmitted and received between a base station and a terminal is assumed and described. However, contents proposed in the disclosure may also be applied to a case in which a base station transmits a downlink signal to a plurality of terminals or a case in which a plurality of codewords or TBs is transmitted and received between a base station and a terminal.

A transmission node (hereinafter a base station to a terminal) that attempts to transmit a signal through an unlicensed band may determine a channel access procedure method based on the type of a signal to be transmitted. For example, if a base station attempts to transmit a downlink signal including a PDSCH through an unlicensed band, the base station may perform a channel access procedure using Type 1 method. Furthermore, if a base station attempts to transmit a downlink signal not including a PDSCH through an unlicensed band, for example, if a base station attempts to transmit a synchronization signal or a PDCCH, the base station may perform a channel access procedure using Type 2 method, and may transmit a downlink signal not including a PDSCH.

In this case, the base station or the terminal may determine the channel access procedure method based on the transmission length of a signal to be transmitted through the unlicensed band or the length of a time or interval in which the unlicensed band is occupied and used. In general, a channel access procedure using Type 1 method may need to be performed for a longer time than a channel access procedure using Type 2 method. Accordingly, if a signal is to be transmitted for a short time interval or for a time of a reference time (e.g., X ms or Y symbol) or less, the base station or the terminal may perform the channel access procedure using Type 2 method. In contrast, if a signal is to be transmitted for a long time interval or for a time greater than a reference time (e.g., X ms or Y symbol) or for the reference time or more, the base station or the terminal may perform the channel access procedure using Type 1 method. In other words, a channel access procedure using a different method may be performed based on the time when an unlicensed band is used.

If the base station or the terminal performs the channel access procedure using Type 1 method based on at least one of the references, the base station or the terminal may determine a channel access priority class (CAPC) based on a quality of service class identifier (QCI) of a signal to be transmitted through an unlicensed band, and may perform the channel access procedure by using at least value of configuration values predefined as in Table 20 with respect to the CAPC. For example, QCIs 1, 2, and 4 may mean QCI values for services, such as Conversational Voice, Conversational Video (Live Streaming), and Non-Conversational Video (Buffered Streaming), respectively. If a signal for a service that is not matched with a QCI in Table 20 is to be transmitted through an unlicensed band, the base station or the terminal may select a QCI closest to the service and the QCI in Table 20, and may select a CAPC therefor.

Table 20 illustrates a mapping relation between CAPCs and QCIs.

TABLE 20

| Channel Access Priority | QCI |
|---|---|
| 1 | 1, 3, 5, 65, 66, 69, 70 |
| 2 | 2, 7 |
| 3 | 4, 6, 8, 9 |
| 4 | — |

For example, the base station or the terminal may determine defer duration according to the determined channel access priority p, a set (CW_p) of a contention window value or size, a minimum value and maximum value (CW_min,p, CW_max,p) of a contention window, a maximum channel occupancy interval (T_mcot,p), etc. through Table 21. In other words, the base station that attempts to transmit a downlink signal through an unlicensed band may perform a channel access procedure for the unlicensed band for at least T_f+m_p*T_sl time. If the base station attempts to perform the channel access procedure based on a CAPC 3 (p=3), the size T_f+m_p*T_sl of defer duration that is necessary to perform the channel access procedure by using m_p=3 may be determined. If the unlicensed band is determined to be in the idle state in the entire m_p*T_sl time, it may result in N=N-1. In this case, N may be selected as an arbitrary integer value between 0 and a value (CW_p) of a contention window at timing at which a channel access procedure is performed. In the case of the CAPC 3, a minimum contention window value and a maximum contention window value are 15 and 63, respectively. If the unlicensed band is determined to be in the idle state in the defer duration and duration in which an additional channel access procedure is performed, the base station may transmit a signal through the unlicensed band for a T_mcot,p time (8 ms). Meanwhile, Table 21 is a table indicating CAPCs in downlink. The disclosure will be described by using a downlink CAPC for convenience of description. However, in the case of uplink, the CAPCs in Table 21 may be reused, or CAPCs for uplink transmission may be defined and used.

TABLE 21

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

Meanwhile, a base station may configure channel access procedure execution information necessary for the uplink transmission of a terminal through higher layer signaling (e.g., an SIB, an MIB, a MAC-CE, or RRC signaling) by using a table. Each column in the table may include at least one piece of information among a channel access procedure type, a CAPC, a cyclic prefix (CP) extension value of uplink (or downlink) OFDM symbol transmission or a timing advance (TA) value. For example, if a base station indicates uplink transmission for a terminal as the DCI format 0_0, the base station may indicate, for a terminal, information necessary for a channel access procedure and uplink transmission by indicating a column corresponding to Table 22 by using a 2-bit "ChannelAccess-CPext" field included in the corresponding DCI format.

TABLE 22

| Bit field mapped to index | Channel Access Type | CP extension |
|---|---|---|
| 0 | Type 3 | C2*symbol length - 16 us - TA |
| 1 | Type 2 | C3*symbol length - 25 us - TA |
| 2 | Type 2 | C1*symbol length - 25 us |
| 3 | Type1 | 0 |

When the base station indicates uplink transmission for the terminal as the DCI format 0_1, the base station may indicate, for the terminal, information necessary for a channel access procedure and uplink transmission by using a "ChannelAccess_CPext" field included in the corresponding DCI format and Table 23.

TABLE 23

| Entry index | Channel Access Type | CP extension | CAPC |
|---|---|---|---|
| 0 | Type3 | 0 | 1 |
| 1 | Type3 | 0 | 2 |
| 2 | Type3 | 0 | 3 |
| 3 | Type3 | 0 | 4 |
| 4 | Type3 | C2*symbol length - 16 us - TA | 1 |
| 5 | Type3 | C2*symbol length - 16 us - TA | 2 |
| 6 | Type3 | C2*symbol length - 16 us - TA | 3 |
| 7 | Type3 | C2*symbol length - 16 us - TA | 4 |
| 8 | Type2 with 16 us | 0 | 1 |
| 9 | Type2 with 16 us | 0 | 2 |
| 10 | Type2 with 16 us | 0 | 3 |
| 11 | Type2 with 16 us | 0 | 4 |
| 12 | Type2 with 16 us | C2*symbol length - 16 us - TA | 1 |
| 13 | Type2 with 16 us | C2*symbol length - 16 us - TA | 2 |
| 14 | Type2 with 16 us | C2*symbol length - 16 us - TA | 3 |
| 15 | Type2 with 16 us | C2*symbol length - 16 us - TA | 4 |
| 16 | Type2 with 25 us | 0 | 1 |
| 17 | Type2 with 25 us | 0 | 2 |
| 18 | Type2 with 25 us | 0 | 3 |
| 19 | Type2 with 25 us | 0 | 4 |
| 20 | Type2 with 25 us | 1*symbol length - 25 us | 1 |
| 21 | Type2 with 25 us | 1*symbol length - 25 us | 2 |
| 22 | Type2 with 25 us | 1*symbol length - 25 us | 3 |
| 23 | Type2 with 25 us | 1*symbol length - 25 us | 4 |
| 24 | Type2 with 25 us | C3*symbol length - 25 us - TA | 1 |
| 25 | Type2 with 25 us | C3*symbol length - 25 us - TA | 2 |
| 26 | Type2 with 25 us | C3*symbol length - 25 us - TA | 3 |
| 27 | Type2 with 25 us | C3*symbol length - 25 us - TA | 4 |
| 28 | Type1 | 0 | 1 |
| 29 | Type1 | 0 | 2 |
| 30 | Type1 | 0 | 3 |
| 31 | Type1 | 0 | 4 |
| 32 | Type1 | 1*symbol length - 25 us | 1 |
| 33 | Type1 | 1*symbol length - 25 us | 2 |
| 34 | Type1 | 1*symbol length - 25 us | 3 |
| 35 | Type1 | 1*symbol length - 25 us | 4 |
| 36 | Type1 | C2*symbol length - 16 us - TA | 1 |
| 37 | Type1 | C2*symbol length - 16 us - TA | 2 |
| 38 | Type1 | C2*symbol length - 16 us - TA | 3 |
| 39 | Type1 | C2*symbol length - 16 us - TA | 4 |
| 40 | Type1 | C3*symbol length - 25 us - TA | 1 |
| 41 | Type1 | C3*symbol length - 25 us - TA | 2 |
| 42 | Type1 | C3*symbol length - 25 us - TA | 3 |
| 43 | Type1 | C3*symbol length - 25 us - TA | 4 |

A base station may configure, for a terminal, at least one entry among the columns in Table 23 through higher signaling. The terminal may receive, from the base station, indication for one entry among at least one entry in Table 23 configured by the base station through a "ChannelAccess-CPext" field. In this case, the size of the "ChannelAccess-CPext" field is determined as $\lceil \log_2(I) \rceil$. I means the number of entries configured by the base station through higher signaling.

An initial contention window value (CW_p) is a minimum value (CW_min,p) of a contention window. A base station that has selected the N value may perform a channel access procedure in a T_sl interval, may change the N value into N=N−1 if it is determined that an unlicensed band is in the idle state through the channel access procedure performed in the T_sl interval, and may transmit a signal for a maximum T_mcot,p time through the unlicensed band when N=0. If the unlicensed band determined through the channel access procedure is not in the idle state in the T_sl time, the base station may perform the channel access procedure again without changing the N value.

A value of the contention window (CW_p) may be changed on the basis of the results of the reception of a PDSCH in a reference subframe or a reference slot, among timing at which the base station initiates the channel access procedure, timing at which the base station selects the N value in order to perform the channel access procedure, or a downlink signal transmission interval (or MCOT) that has been most recently transmitted through the unlicensed band right before the timing. In other words, the base station may receive, from the terminal, reporting for the reception results of downlink data transmitted in the reference subframe or the reference slot, and may increase or minimize the size of CW_p based on a ratio Z of NACK among the reception results.

Figure 10:
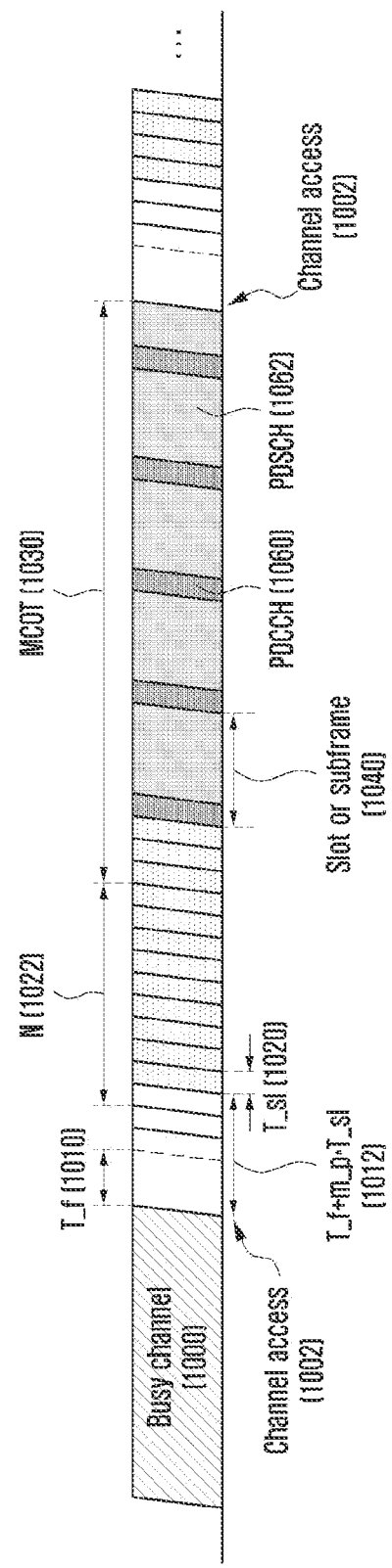
FIG. 10 is a diagram illustrating an example of a method of determining a contention window (CW_p) according to an embodiment of the disclosure.

FIG. 10 is a diagram illustrating an example of a method of determining a contention window (CW_p) according to an embodiment of the disclosure.

FIG. 10 is described as an example, at timing 1002 at which a base station initiates a channel access procedure, timing at which the base station selects the N value in order to perform the channel access procedure, or timing right before the timing, the first transmission interval 1040 (hereinafter a slot to a subframe) of a downlink signal transmission interval 1030 that has been most recently transmitted through an unlicensed band becomes a contention window change reference slot for a channel access procedure 1002. If the base station cannot receive reporting for the reception results of a PDSCH transmitted in the first slot 1040 of the transmission interval 1030, for example, if a time interval between the first subframe and the timing 1002 at which the base station initiates the channel access procedure is equal to or smaller than n slots or subframes, that is, if the base station initiates the channel access procedure before the time when a terminal may report the reception results of the PDSCH with respect to the first subframe 1040, the first subframe of the most recent downlink signal transmission interval transmitted prior to the downlink signal transmission interval 1030 becomes the reference subframe. In other words, at the timing 1002 at which the base station initiates the channel access procedure, at the timing at which the base station selects the N value in order to perform the channel access procedure, or at timing right before the timing, if the base station does not receive, from the terminal, the reception results of the downlink data transmitted in the reference subframe 1040, the base station may determine, as the reference subframe, the first subframe of the downlink signal transmission interval that has been most recently transmitted, among the reception results of the PDSCH previously received from terminals. Furthermore, the base station may determine a contention window size that is used for the channel access procedure 1002 by using the downlink data reception results received from the terminals with respect to the downlink data transmitted through a PDSCH in the reference subframe.

For example, a base station that has transmitted a downlink signal according to a channel access procedure (e.g., CW_p=15) configured based on CAPC 3 (p=3) may increase a contention window from an initial value (e.g., CW_p=15) to a next contention window value (e.g., CW_p=31) if it is determined that a reception result of 80% or more among reception results of a terminal for downlink data that has been transmitted to the terminal through a PDSCH in the first subframe, among downlink signals transmitted through an unlicensed band, is NACK.

If it is determined that the reception result of 80% or more among the reception results of the terminal is not NACK, the base station may maintain a value of the contention window to the existing value or may change the value of the contention window to an initial value of the contention window. In this case, a change in the contention window may be applied to all CAPCs in common or may be applied to only a CAPC that has been used in the channel access procedure. In this case, a method of determining reception results that are valid in determining a change in the size of the contention window among reception results transmitted or reported from the terminal to the base station with respect to the downlink data transmitted through the PDSCH in a reference subframe or a reference slot for determining a change in the size of the contention window, in other words, a method of determining a Z value is as follows.

If the base station has transmitted one or more codewords or TBs to one or more terminals in a reference subframe or a reference slot, the base station may determine the Z value as a ratio of NACK among reception results transmitted or reported with respect to a TB received by the terminal in the reference subframe or the reference slot. For example, if two codewords or two TBs have been transmitted to one terminal in the reference subframe or the reference slot, the base station receives reporting for the reception results of a downlink data signal for the two TBs from the terminal. If the ratio Z of NACK among the two reception results has been previously defined or is equal to or greater than threshold (e.g., Z=80%) configured between the base station and the terminal, the base station may change or increase the size of the contention window.

In this case, if the terminal bundles downlink data reception results for one or more subframes (e.g., M subframes) including the reference subframe or slot and transmits or reports the downlink data reception results to the base station, the base station may determine that the terminal has transmitted the M reception results. Furthermore, the base station may determine the Z value as the ratio of NACK among the M reception results, and may change, maintain, or initiate the size of the contention window.

If the reference subframe is reception results for the second slot of two slots constituting one subframe, the base station may determine the Z value as the ratio of NACK among reception results transmitted or reported from the terminal to the base station with respect to downlink data received in the reference subframe (in other words, the second slot) and a next subframe.

Furthermore, in a case in which scheduling information or downlink control information for a PDSCH transmitted by the base station is transmitted in the same cell or frequency band as a cell or a frequency band in which the PDSCH is transmitted or a case in which scheduling information or downlink control information for a PDSCH transmitted by the base station is transmitted through an unlicensed band or transmitted in a cell different from a cell in which the PDSCH is transmitted or transmitted in a different frequency, if it is determined that the terminal has not transmitted reception results for downlink data received in the reference subframe or reference slot and if the reception results for the downlink data transmitted by the terminal are determined as DTX, or NACK/DTX, or any state, the base station may determine the Z value by determining the reception results of the terminal as NACK.

Furthermore, in a case in which scheduling information or downlink control information for a PDSCH transmitted by the base station is transmitted through a licensed band, if reception results for the downlink data transmitted by the terminal are determined as DTX, or NACK/DTX, or any state, the base station may not include the reception results of the terminal in the reference value Z of a change in the contention window. In other words, the base station may neglect the reception results transmitted or reported by the terminal, and may determine the Z value.

Furthermore, in a case in which the base station transmits scheduling information or downlink control information for a PDSCH through a licensed band, if the base station has not actually transmitted downlink data (no transmission) among reception results of downlink data for a reference subframe or a reference slot transmitted or reported from the terminal to the base station, the base station may neglect the reception results transmitted or reported by the terminal with respect to the downlink data, and may determine the Z value.

Meanwhile, when a base station and a terminal transmit and receive signals having directionality (e.g., beam-based signal transmission), if the base station and the terminal perform the aforementioned channel access procedure with respect to all directions, a transmission opportunity may be reduced due to the execution of an unnecessary channel access procedure. Accordingly, the disclosure proposes a method and apparatus capable of improving a channel access opportunity by performing, by a base station and a terminal, a channel access procedure based on directionality information.

The wireless communication system and the method and apparatus proposed in an embodiment of the present disclosure have been described on the basis of an NR system, but the contents of the disclosure are not limited to the NR system and may be applied to various wireless communication systems, such as LTE, LTE-A, LTE-A-Pro, and 5G. Furthermore, the contents in the disclosure are described on the basis of a system and device that transmit and receive signals by using an unlicensed band, but the contents of the disclosure may also be applied to a system that operates in a licensed band. Furthermore, in an embodiment of the present disclosure, a base station and a terminal that operate in an unlicensed band will be assumed and described, but a method and apparatus proposed in an embodiment of the present disclosure may be applied to a base station and a terminal that operate in a licensed band or a shared spectrum or a sidelink in addition to the unlicensed band.

Hereinafter, in the disclosure, higher signaling or a higher signal is a method of transferring a signal that is transferred from a base station to a terminal by using a downlink data channel of a physical layer or from a terminal to a base station by using a PUSCH of a physical layer, and includes a method of transferring a signal that is transferred through RRC signaling, or PDCP signaling, or a MAC control element (MAC CE). Furthermore, the higher signaling or the higher signal may include system information transmitted to a plurality of terminals in common, for example, a system information block (SIB).

Hereinafter, in an embodiment of the present disclosure, an arbitrary integer value N may mean an integer value that is arbitrarily selected for the aforementioned channel access procedure, between 0 and a value (CW_p) of a contention window at timing at which the channel access procedure is performed. Furthermore, hereinafter, in an embodiment, selecting the arbitrary integer value N may fully include selecting an N value common to channel access procedures, independently selecting N1, N2, and N3 values for each channel access procedure, or selecting a common value for some of the N1, N2, and N3 values and independently selecting values for other some of the N1, N2, and N3 values. Furthermore, hereinafter, in an embodiment, three directions (or beams) are described as an example, but the number of directions (or beams) taken into consideration for the execution of a channel access procedure may be variously configured. Furthermore, hereinafter, in an embodiment, the same contents as or contents similar to contents disclosed with respect to a channel access procedure and downlink signal transmission method of a base station may also be applied to a channel access procedure and uplink signal transmission of a terminal. Furthermore, hereinafter, in an embodiment, the same contents as or contents similar to contents disclosed with respect to a channel access procedure and uplink signal transmission method of a terminal may also be applied to a channel access procedure and uplink signal transmission of a base station. Furthermore, hereinafter, embodiments may be combined and used.

Embodiment 1

Figure 11:
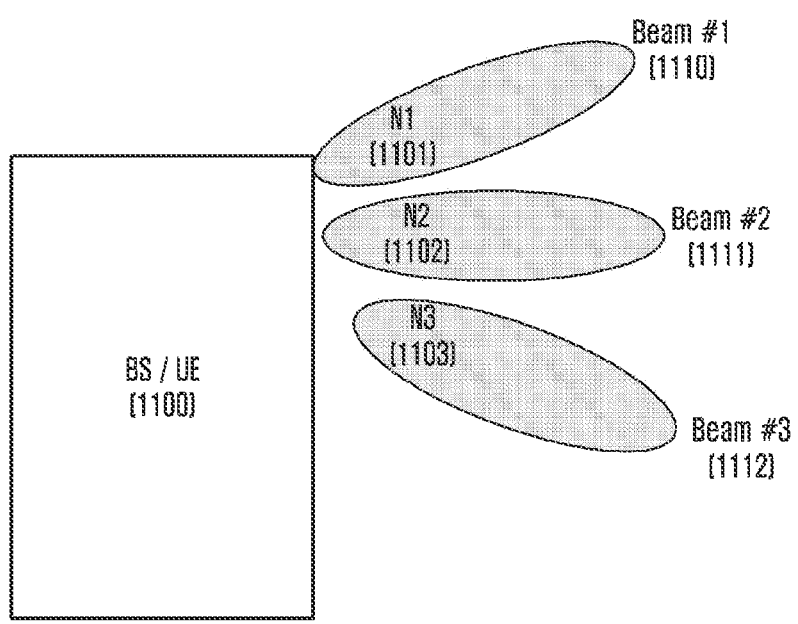
FIG. 11 is a diagram illustrating a method of performing, by a base station and a terminal, a channel access procedure according to an embodiment of the disclosure.

The present embodiment proposes a method of performing, by a base station and a UE operating in an unlicensed band, a channel access procedure. More specifically, the base station and the UE may perform the channel access procedure on a specific direction (or beam) in which a signal will be transmitted. FIG. 11 is a diagram illustrating a method of performing, by a base station and a UE, a channel access procedure according to an embodiment of the disclosure. Description is given as follows with reference to FIG. 11. A base station (or a UE 1100) may perform a channel access procedure for each specific direction (or beam) 1110, 1111, or 1112. In this case, the base station (or the UE) may select an arbitrary integer value N (N1, N2, or N3) 1101, 1102, or 1103 for performing the channel access procedure for each specific direction (or beam) 1110, 1111, or 1112. A method of configuring and determining, by a base station and a UE, a specific direction (or beam) is described in detail.

(1-1)-th Embodiment

A base station and a UE may configure a spatial domain reception filter (or a spatial Rx filter) based on a spatial domain transmission filter (or a spatial Tx filter) configured in order to transmit a signal in a specific direction (hereinafter or a beam). The base station and the UE may perform a channel access procedure for each configured reception filter (or transmission filter). In this case, the base station and the UE may select an arbitrary integer value N for performing the channel access procedure for each reception filter (or transmission filter).

(1-2)-th Embodiment

A base station may select an arbitrary integer value N for performing a channel access procedure for each SSB index. The base station may configure a spatial domain reception filter based on a spatial domain transmission filter configured in order to transmit an SSB. The base station may select an arbitrary integer value N for each configured reception filter (or transmission filter), and may perform the channel access procedure. If the base station transmits a plurality of SSBs in the same direction or applies the same spatial domain transmission filter to a plurality of SSBs, only one arbitrary integer value N may be selected with respect to a plurality of corresponding SSB indices.

(1-3)-th Embodiment

A base station may select an arbitrary integer value N for performing a channel access procedure for each TCI state (or TCI state index (ID)). The base station may perform the channel access procedure for each ID whose QCL type has been configured as type D among TCI states configured through higher signaling. In this case, the base station may configure a spatial domain reception filter based on a spatial domain transmission filter configured to transmit a reference signal configured in each TCI state. The base station may select the arbitrary integer value N for each configured reception filter (or transmission filter), and may perform the channel access procedure. Meanwhile, the base station may configure, for a UE, a separate TCI state ID for performing a beam-based channel access procedure through higher signaling. If the base station configures a reference signal having the same space domain transmission configuration in a plurality of TCI state indices, only one arbitrary integer value N may be selected with respect to the plurality of corresponding TCI state indices.

(1-4)-th Embodiment

A base station may select an arbitrary integer value N for performing a channel access procedure for each spatial relation info index configured for the PUCCH transmission of a UE. The base station may configure a reception filter based on a spatial domain transmission filter configured to transmit a reference signal configured in each piece of PUCCH spatial relation info. The base station may select the arbitrary integer value N for each configured reception filter (or transmission filter), and may perform the channel access procedure. Furthermore, the base station may perform the aforementioned channel access procedure for each PUCCH resource or each PUCCH resource set.

(1-5)-th Embodiment

A base station and a UE may select an arbitrary integer value N in order to perform a channel access procedure for each SRS resource index. The base station and the UE may configure a spatial domain reception filter based on a spatial domain transmission filter configured to transmit a reference signal to which spatial relation info configured in an SRS resource refers. The base station may select the arbitrary integer value N for each configured reception filter (or transmission filter), and may perform the channel access procedure. If the base station refers to a reference signal having the same space domain transmission configuration with respect to a plurality of SRS resource indices, only one arbitrary integer value N may be selected with respect to the plurality of corresponding SRS resource indices. As still another method, the base station may separately configure SRS spatial relation info for the UE through higher signaling. In this case, the base station may perform the channel access procedure according to the aforementioned method for each SRS spatial relation info index.

Embodiment 2

The present embodiment proposes a method of performing, by a base station and a UE operating in an unlicensed band, a channel access procedure. More specifically, the base station and the UE may perform a channel access procedure on a specific direction in which a signal is transmitted. If a band (or direction to beam) is determined as an idle band (or direction to beam) as a result of the channel access procedure, the base station and the UE may perform transmission in the corresponding band (or direction to beam). Furthermore, the UE may transmit an uplink signal in the direction of a band (or direction to beam) obtained by the base station. In this case, the UE may determine a channel access procedure to be performed in order to transmit the uplink signal by taking into consideration the band (or direction to beam) obtained by the base station and a band (or direction to beam) in which the UE will transmit the uplink signal. A detailed method of the channel access procedure is provided below.

(2-1)-th Embodiment

When scheduling the uplink transmission of a UE, a base station may transmit, to the UE, DCI that schedules the uplink transmission by including a TCI state indicator in the DCI. If the TCI state indicator (or DCI) is valid information, the UE may determine a channel access procedure with reference to a reference signal that has been configured in a TCI state received from the base station. The UE may configure a spatial domain transmission filter based on a spatial domain reception filter that has been used to receive the reference signal configured in the TCI state. In this case, if the UE transmits an uplink signal by using the spatial domain transmission filter configured based on the spatial domain reception filter, the UE may omit (to may not perform) the channel access procedure, and may transmit the uplink signal. Alternatively, if the UE transmits an uplink signal by using the spatial domain transmission filter configured based on the spatial domain reception filter, the UE may perform the channel access procedure for only a fixed interval (e.g., 25 us) or a fixed slot. Alternatively, after performing the channel access procedure indicated in the DCI, the UE may perform uplink transmission in a corresponding direction (or beam).

(2-2)-th Embodiment

A base station may configure spatial relation info of an SRS for a UE through higher signaling. Furthermore, the base station may activate some of the configured spatial relation info of the SRS for the UE through a MAC CE. Thereafter, the base station may transmit uplink transmission scheduling DCI to the UE by including an SRS spatial relation info index value in the uplink transmission scheduling DCI. If the DCI received by the UE is determined as valid DCI, the UE may configure a spatial domain transmission filter based on a spatial domain reception filter that has been used to receive a reference signal configured in the spatial relation info of the SRS. In this case, if the UE transmits an uplink signal by using the spatial domain transmission filter configured based on the spatial domain reception filter, the UE may omit (or may not perform) the execution of a channel access procedure. Alternatively, if the UE transmits the uplink signal by using the spatial domain transmission filter configured based on the spatial domain reception filter, the UE may perform the channel access procedure for only a fixed time (e.g., 25 us) or a fixed slot. Alternatively, after performing the channel access procedure indicated in the DCI, the UE may perform uplink transmission in a corresponding direction (or beam).

As still another method, a base station may transmit uplink scheduling DCI by including an SRS resource ID in the uplink scheduling DCI. If DCI received by a UE is determined as valid DCI, the UE may configure a spatial domain transmission filter based on a spatial domain reception filter that has been used to receive a reference signal to which spatial relation info of an SRS configured in the SRS resource ID included in the DCI refers. In this case, if the UE transmits an uplink signal by using the spatial domain transmission filter configured based on the spatial domain reception filter, the UE may omit (or may not perform) a channel access procedure. Alternatively, if the UE transmits an uplink signal by using the spatial domain transmission filter configured based on the spatial domain reception filter, the UE may perform the channel access procedure for only a fixed interval (e.g., 25 us) or fixed slot and then transmit the uplink signal. Alternatively, after performing the channel access procedure indicated in the DCI, the UE may perform uplink transmission in a corresponding direction (or beam). If an SRS resource indicator indicates one or more SRS resources (e.g., if one or more PUSCH layers have been configured), the UE may assume an SRS resource having the lowest (or highest) index among the indicated SRS resources.

(2-3)-th Embodiment

A base station may configure one or more pieces of PUCCH spatial relation info for a UE through higher signaling (e.g., RRC). The base station may activate some of the configured PUCCH spatial relation info for the UE through a MAC CE. The base station may transmit, to the UE, uplink transmission scheduling DCI by including a PUCCH spatial relation info index indicator in the uplink transmission scheduling DCI. If the DCI received by the UE is determined as valid DCI, the UE may configure a spatial domain transmission filter based on a spatial domain reception filter that has been used to receive a reference signal configured in the PUCCH spatial relation info. In this case, the UE may transmit an uplink signal by using the spatial domain transmission filter configured in the spatial domain reception filter. In this case, the UE may omit (or may not perform) a channel access procedure. Alternatively, if the UE transmits the uplink signal by using the spatial domain transmission filter configured in the spatial domain reception filter, the UE may perform the channel access procedure for only a fixed time (e.g., 25 us) or fixed slot. Alternatively, after performing the channel access procedure indicated in the DCI, the UE may perform uplink transmission in a corresponding direction (or beam).

As still another method, a base station may configure, for a UE, PUCCH spatial relation info by including the PUCCH spatial relation info in a PUCCH resource index or a PUCCH resource set index through higher signaling. The base station may include a PUCCH resource indicator in uplink transmission scheduling DCI. If the DCI received by the UE is determined as valid DCI, the UE may refer to the PUCCH spatial relation info configured in the PUCCH resource indicator (or the PUCCH resource set) of the received DCI. The UE may configure a spatial domain transmission filter based on a spatial domain reception filter that has been used to receive a reference signal configured in the PUCCH spatial relation info. In this case, the UE may transmit an uplink signal by using the spatial domain transmission filter configured in the spatial domain reception filter. In this case, the UE may omit (or may not perform) a channel access procedure. Alternatively, if the UE transmits the uplink signal by using the spatial domain transmission filter configured in the spatial domain reception filter, the UE may perform the channel access procedure for only a fixed time (e.g., 25 us) or fixed slot. Alternatively, after performing the channel access procedure indicated in the DCI, the UE may perform uplink transmission in a corresponding direction (or beam). Meanwhile, the aforementioned PUCCH spatial relation info may be applied to the transmission of all uplink signals or may be limited and applied to only some uplink signals (e.g., PUCCH transmission).

(2-4)-th Embodiment

When transmitting an uplink signal (or a configured grant PUSCH), a UE may perform channel access in a specific direction (or beam). In this case, the UE may refer to separate SRS spatial relation info configured through higher signaling from a base station or SRS spatial relation info within an SRS resource. More specifically, the UE may perform a channel access procedure based on a spatial domain reception filter that has been used to receive a reference signal to which the SRS spatial relation info configured through higher signaling from the base station refers. Furthermore, the UE may transmit an uplink signal based on a corresponding spatial domain reception filter configuration. In this case, the UE may include, in uplink control information, an SRS spatial relation info indicator (or an SRS resource indicator) assumed when performing a channel access procedure. The uplink control information may be transmitted by being included in a PUCCH or a PUSCH. If the base station that has received the SRS spatial relation info indicator (or the SRS resource indicator) from the UE transmits downlink by using the spatial domain transmission filter that is used to transmit the reference signal to which the corresponding SRS spatial relation info refers, the base station may omit (or may not perform) a channel access procedure. Alternatively, if the base station transmits downlink by using the spatial domain transmission filter that is used to transmit the reference signal to which the corresponding SRS spatial relation info refers, the base station may perform a channel access procedure for only a fixed time (e.g., 25 us) or fixed slot. Meanwhile, in the aforementioned situation, if the base station omits (or does not perform) the channel access procedure or performs the channel access procedure for only the fixed time (or fixed slot) based on information received from the UE, the base station may omit (or may not perform) the channel access procedure within only a maximum channel occupation interval obtained by the UE or for only the fixed time (or fixed slot). Furthermore, if the base station omits (or does not perform) the channel access procedure or performs the channel access procedure for only the fixed time (or fixed slot) based on the SRS spatial relation info information indicated from the UE, when the base station receives, from the UE, a shared indicator indicating that a channel obtained by the UE is shared with the base station, the base station may omit (or may not perform) the channel access procedure or may perform the channel access procedure for only the fixed time (or fixed slot). Furthermore, the maximum channel occupation interval and shared indicator of the UE may be indicated for the base station through uplink control information.

(2-5)-th Embodiment

A base station may transmit, to a UE, a beam shared indicator by including the beam shared indicator in uplink scheduling DCI. The UE that has received the beam shared indicator may share a beam obtained by the base station by using the aforementioned method.

In the embodiment, as an example of a method of determining valid DCI, when an interval between a symbol at which the transmission of a PDCCH including DCI is ended and a downlink (or uplink) start symbol scheduled by the PDCCH is greater than a given symbol (e.g., timeDuration-ForQCL) or a given time value, the corresponding DCI may be determined as valid DCI. If DCI received by a UE is not determined as valid DCI, a UE (or a base station) may drop (or omit to delay) an uplink (or downlink) signal or may perform a channel access procedure and then transmit an uplink (or downlink) signal. In this case, the channel access procedure may be performed in a different beam (or direction to the entire direction) to a corresponding beam (or direction). The base station (or the UE) may indicate the corresponding channel access procedure through DCI, may configure the corresponding channel access procedure through higher signaling, or may previously determine the corresponding channel access procedure. Furthermore, the base station (or the UE) may perform a channel access procedure (e.g., type 1 channel access procedure) for a variable time.

Embodiment 3

The present embodiment proposes a method of performing, by a base station and a UE operating in an unlicensed band, a channel access procedure. More specifically, the base station may perform a channel access procedure on a specific direction (or beam) in which a signal will be transmitted. The base station may perform a channel access procedure on a plurality of directions (or beams). In this case, there is proposed a method of selecting an arbitrary integer value N from a plurality of directions (or beams) and performing a channel access procedure.

(3-1)-th Embodiment

A base station may select an arbitrary integer value N for each specific direction (or beam) in which a signal will be transmitted. There is below proposed a method of performing, by a base station, a channel access procedure based on an arbitrary integer value N selected for each beam (or direction).
[Method 1]
A base station may determine, as an idle band (or direction to beam), one or more beams (or directions) in which a signal will be transmitted as a result of a channel access procedure when all of arbitrary integer values N selected from the one or more beams (or directions), respectively, become 0, and may perform downlink transmission.

Figure 12A:
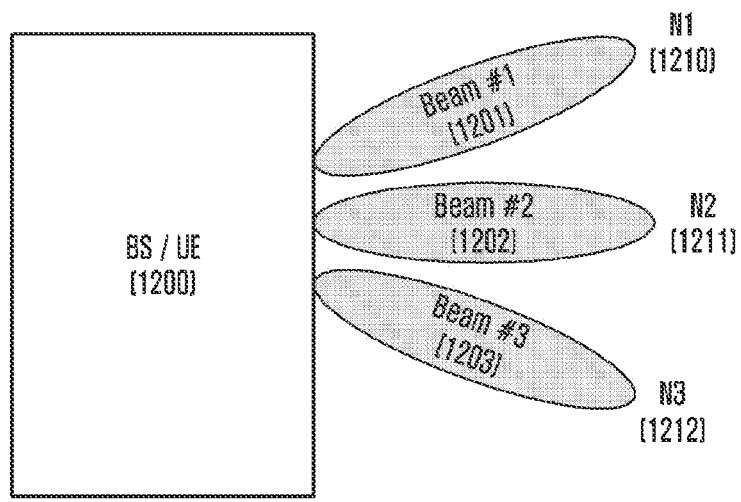
FIG. 12A is a diagram illustrating a method of performing, by a base station and a terminal, a channel access procedure according to an embodiment of the disclosure.

FIG. 12A is a diagram illustrating a method of performing, by a base station and a UE, a channel access procedure according to an embodiment of the disclosure. The method is described with reference to FIG. 12A. The base station may select arbitrary integers N as N1 1210, N2 1211, and N3 1212 with respect to beams #1 to #3 1201, 1202, and 1203 on which a channel access procedure is performed, respectively. If the beam #1 1201 is determined as an idle beam (or band to direction) as a result of the channel sensing of the base station, the base station may change N1 of the beam #1 1201 into N1=N1−1. The base station may apply the same method to each beam. When all of the N1, N2, and N3 values become 0, the base station may transmit a downlink signal by using the beams #1 to #3 1201, 1202, and 1203. As another method, when the N value becomes 0 in at least one direction (or beam), the base station may perform downlink transmission on one or more directions (or beams) whose N values become 0. For example, the base station may select an arbitrary integer N as each of the N1 1210, N2 1211, and N3 1212 with respect to each of the beams #1 to #3 1201, 1202, and 1203 on which a channel access procedure is performed. If the beam #1 1201 is determined as an idle beam (or band to direction) as a result of the channel sensing of the base station, the base station may change N1 of the beam #1 1201 into N1=N1−1. The base station may apply the same method to each beam. In this case, when at least one of the N1, N2, and N3 values becomes 0 (e.g., N1=0), the base station may transmit a downlink signal by using a corresponding beam (e.g., the beam #1). In this case, the base station may not transmit a signal in the beam #2 and the beam #3, and the N2 and N3 values of the beam #2 and the beam #3 may be maintained.
[Method 2]
A base station may select an arbitrary integer value N with respect to each of one or more beams (or directions) in which a signal will be transmitted. Next, the base station may configure, in each beam (or direction), the greatest (or smallest) N value of the selected arbitrary integer values selected with respect to the one or more beams (or directions). For example, this is described as follows with reference to FIG. 12A. The base station may select arbitrary integers of the beams #1, #2, and #3 as N1, N2, and N3, respectively. When the N1 value is the greatest, the base station may configure an arbitrary integer value as N1 with respect to the beams #1, #2, and #3.

Thereafter, the base station may perform a channel access procedure on all the directions (or beams). When all of N (e.g., N1) values configured in all of the directions (or beams) become 0, the base station may determine all of the directions (or beams) as idle bands (or directions to beams) and perform downlink transmission. For example, when the N1 value among the N1, N2, and N3 selected with respect to the beams #1, #2, and #3 is the greatest, arbitrary integers N of the beams #1, #2, and #3 may be configured as N1, N1, and N1. If the beam #1 is determined as an idle beam (or band to direction) as a result of the channel sensing of the base station, the base station may change N1 of the beam #1 into N1=N1−1. The base station may apply the same method to each beam. When the N1 values of all of the beams become 0, the base station may transmit a downlink signal by using the beams #1, #2, and #3. As another method, when an N (e.g., N1) value determined in at least one direction (or beam) becomes 0, the base station may perform downlink transmission on only one or more directions (or beams) whose N (e.g., N1) values become 0. For example, the base station may select arbitrary integers for the beams #1, #2, and #3 as N1, N1, and N1, respectively. If the beam #1 is determined as an idle beam (or band to direction) as a result of the channel sensing of the base station, the base station may change N1 of the beam #1 into N1=N1−1. The base station may apply the same method to each beam. In this case, when at least one of the N1 values of the beams becomes 0 (e.g., N1 of the beam #1 is 0), the base station may transmit a downlink signal by using a corresponding beam (e.g., the beam #1). In this case, the base station may not transmit a signal in the beam #2 and the beam #3, and the N1 values of the beam #2 and the beam #3 may be maintained.

(3-2)-th Embodiment

Figure 12B:
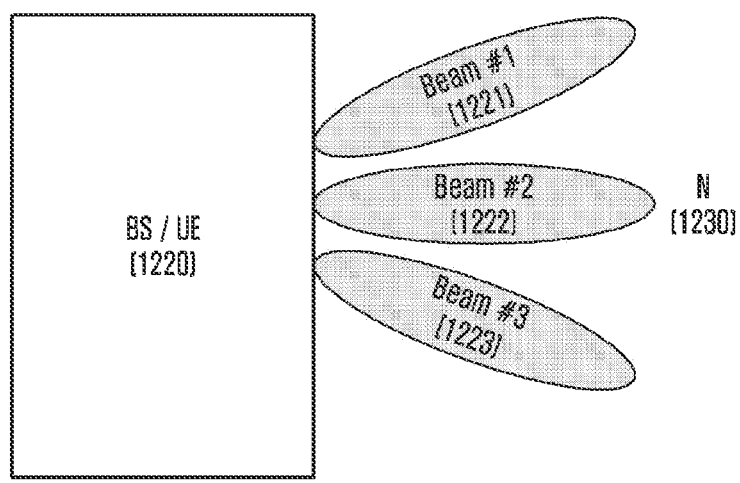
FIG. 12B is a diagram illustrating a method of performing, by a base station and a terminal, a channel access procedure according to another embodiment of the disclosure.

FIG. 12B is a diagram illustrating a method of performing, by a base station and a UE, a channel access procedure according to another embodiment of the disclosure. The method is described as follows with reference to FIG. 12B. The base station may constitute a specific direction (or beam) in which a signal will be transmitted as one set 1221, 1222, and 1223. The base station may select one arbitrary integer value N 1230 from beams (or directions) included in the one set. In this case, if at least one beam within the constituted set is determined as an idle direction (or beam to band) as a results of sensing, the base station may change an N value into N=N−1. As still another method, if all beams within the constituted set are determined as idle directions (or beams to bands) as a result of sensing, the base station may change an N value into N=N−1. When the N value becomes 0, the base station may perform downlink transmission in all the beams within the constituted set.

Figure 13:
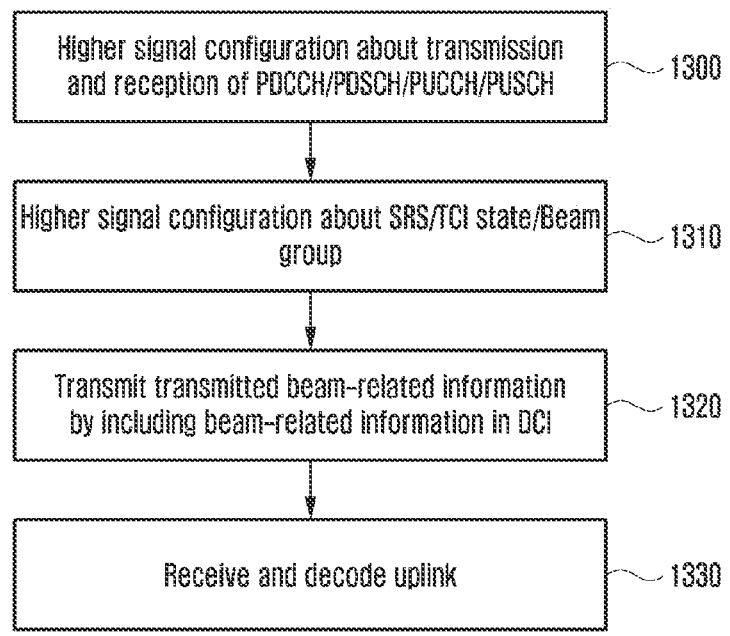
FIG. 13 is a diagram illustrating an operation of a base station according to an embodiment of the disclosure.

FIG. 13 is a diagram illustrating an operation of a base station according to an embodiment of the disclosure.

An operation of the base station according to an embodiment of the present disclosure is described as follows by using FIG. 13.

In step 1300, the base station may transmit, to a UE, a configuration relating to the transmission and reception of a PDCCH, a PDSCH, a PUCCH, or a PUSCH through a higher signal. For example, the base station may transmit, to the UE, a PDCCH resource region or CORESET configuration in which downlink or uplink scheduling information is received, a search space configuration, etc. through a higher signal. Furthermore, the base station may transmit, to the UE, a configuration relating to PDSCH/PUSCH transmission and reception, including offset information between a PDCCH reception slot and a PDSCH reception slot or offset information between a PDCCH reception slot and a PUSCH transmission slot, PDSCH or PUSCH repetition transmission number information, of the UE, etc. through a higher signal. Furthermore, the base station may transmit, to the UE, a configuration relating to a PUCCH resource or a PUCCH resource set, and spatial relation info of a PUCCH through a higher signal. In step 1310, the base station may transmit, to the UE, a configuration relating to an SRS resource, an SRS resource set, or spatial relation info of an SRS through a higher signal. Furthermore, the base station may additionally transmit configuration information related to a TCI state. In this case, information that is transmitted to the UE in step 1310 may be transmitted in step 1300. In step 1320, the base station may transmit, to the UE, information for beam information configured when the base station performs a channel access procedure by including the information in DCI. In step 1330, the base station may receive and decode uplink in a beam direction configured for the UE.

Figure 14:
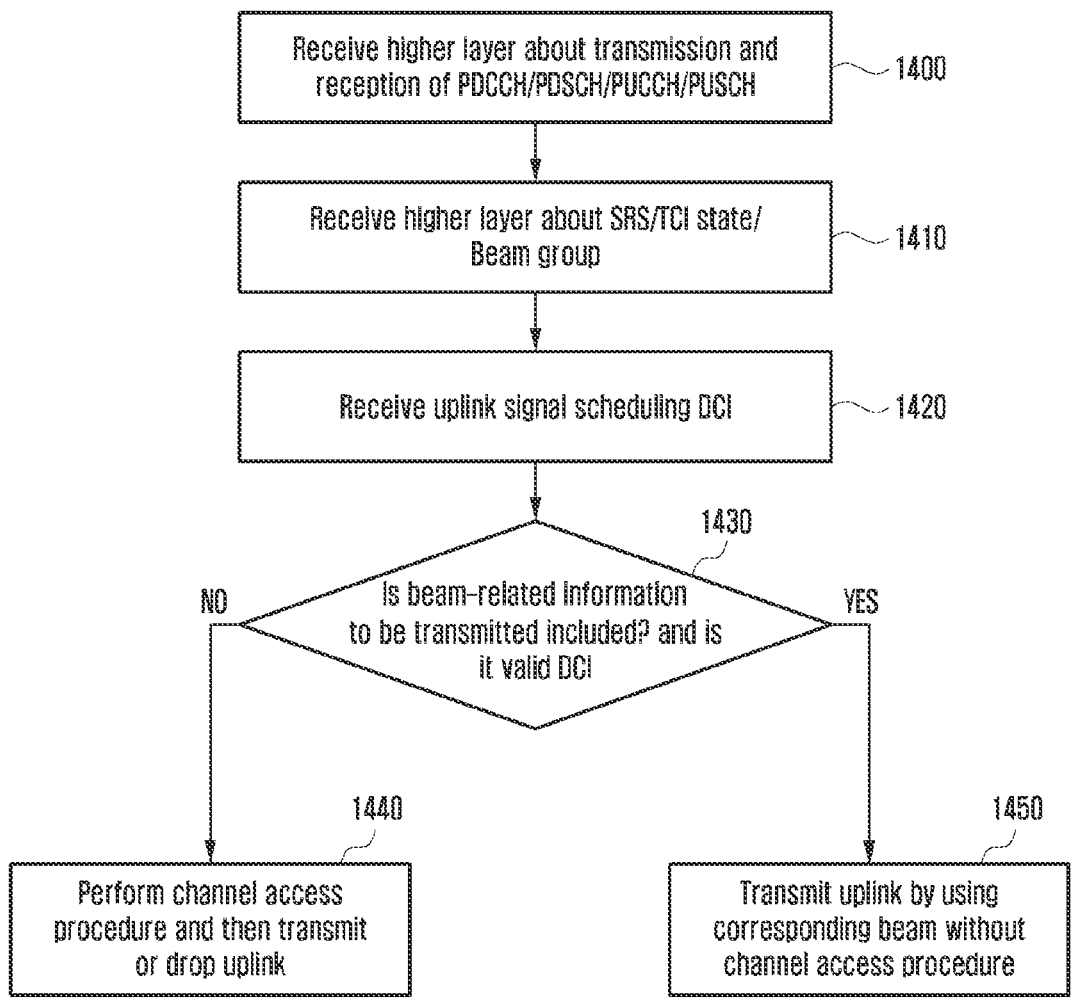
FIG. 14 is a diagram illustrating an operation of a terminal according to an embodiment of the disclosure.

FIG. 14 is a diagram illustrating an operation of a UE according to an embodiment of the disclosure.

A UE operation according to an embodiment of the present disclosure is described as follows by using FIG. 14.

In step 1400, the UE receives a configuration relating to the transmission and reception of a PDCCH, a PDSCH, a PUCCH, or a PUSCH from a base station through a higher signal, and performs a configuration relating to the transmission and reception of a PDCCH, a PDSCH, a PUCCH, or a PUSCH based on the received configuration information. For example, the UE may be configured with a PDCCH resource region or CORESET configuration in which downlink or uplink scheduling information is received from the base station, a search space configuration, etc. through a higher signal. Furthermore, the UE may receive, from the base station, a configuration relating to the transmission and reception of a PDSCH/PUSCH, including offset information between a PDCCH reception slot and a PDSCH reception slot or offset information between a PDCCH reception slot and a PUSCH transmission slot, PDSCH or PUSCH repetition transmission number information, etc., through a higher signal. Furthermore, the UE may be configured with a configuration relating to a PUCCH resource or a PUCCH resource set and spatial relation info of a PUCCH through a higher signal. In step 1410, the UE may additionally receive a configuration relating to an SRS resource or an SRS resource set or spatial relation info of an SRS from the base station. Furthermore, in step 1410, the UE may additionally receive configuration information relating to a TCI state. In step 1420, the UE may receive DCI indicative of downlink reception or uplink transmission from the base station. If the DCI received by the UE includes information indicative of a direction (or beam) on which the base station has performed a channel access procedure to a direction (or beam) in which the UE will transmit an uplink signal in step 1430, in step 1450, the UE may transmit an uplink signal by using a corresponding beam without a channel access procedure. If the DCI received by the UE does not include beam-related information for uplink transmission in step 1430, in step 1440, the UE may perform a channel access procedure, and may transmit or drop an uplink signal.

Figure 15:
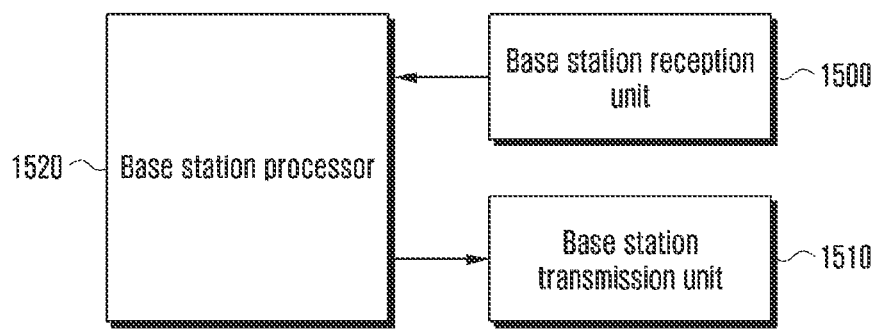
FIG. 15 is a block diagram illustrating a structure of a base station according to an embodiment of the disclosure.

FIG. 15 is a block diagram illustrating a structure of a base station according to an embodiment of the disclosure.

As illustrated in FIG. 15, the base station of the disclosure may include a base station reception unit 1500, a base station transmission unit 1510, and a base station processor 1520. The base station reception unit 1500 and the base station transmission unit 1510 may be commonly called a transceiver unit in an embodiment of the present disclosure. The transceiver unit may transmit and receive signals to and from a terminal. The signal may include control information and data. To this end, the transceiver unit may include an RF transmitter for up-converting and amplifying the frequency of a transmitted signal, an RF receiver for low-noise-amplifying a received signal and down-converting the frequency of the signal, etc. Furthermore, the transceiver unit may receive a signal through a wireless channel, may output the signal to the base station processor 1520, and may transmit a signal output by the base station processor 1520 through a wireless channel. The base station processor 1520 may control a series of processes so that the base station may operate according to the aforementioned embodiment of the present disclosure. For example, the base station processor 1520 may perform a channel access procedure on an unlicensed band. As a detailed example, the base station reception unit 1520 may receive signals transmitted in an unlicensed band. The base station processor 1520 may determine whether the unlicensed band is in the idle state by comparing the intensity of the received signal, etc. with a threshold that has been previously defined or that has been determined by using a value having a value of a function using a bandwidth, etc. as a factor. In this case, the base station processor 1520 may perform the channel access procedure for each direction (or beam).

Figure 16:
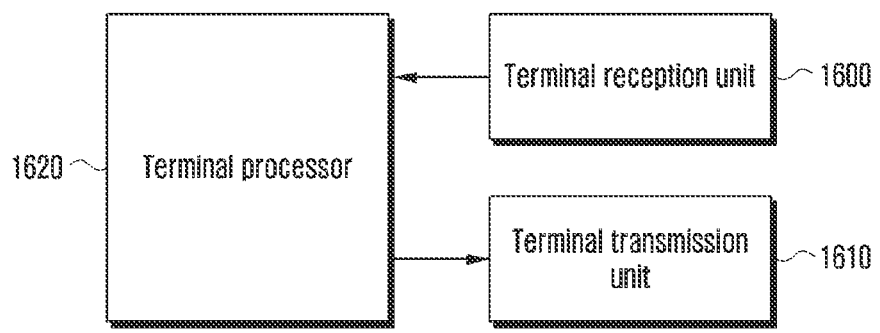
FIG. 16 is a block diagram illustrating a structure of a terminal according to an embodiment of the disclosure.

FIG. 16 is a block diagram illustrating a structure of a terminal according to an embodiment of the disclosure.

As illustrated in FIG. 16, the terminal of the disclosure may include a terminal reception unit 1600, a terminal transmission unit 1610, and a terminal processor 1620. The terminal reception unit 1600 and the terminal transmission unit 1610 may be commonly called a transceiver unit in an embodiment of the present disclosure. The transceiver unit may transmit and receive signals to and from a base station. The signal may include control information and data. To this end, the transceiver unit may include an RF transmitter for up-converting and amplifying the frequency of a transmitted signal, an RF receiver for low-noise-amplifying a received signal and down-converting the frequency of the signal, etc. Furthermore, the transceiver unit may receive a signal through a wireless channel, may output the signal to the terminal processor 1620, and may transmit a signal output by the terminal processor 1620 through a wireless channel. The terminal processor 1620 may control a series of processes so that the terminal may operate according to the aforementioned embodiment of the present disclosure. For example, the terminal processor 1620 may perform a channel access procedure on an unlicensed band. As a detailed example, the terminal processor 1620 may receive signals transmitted in an unlicensed band. The terminal processor 1620 may determine whether the unlicensed band is in the idle state by comparing the intensity of the received signal, etc. with a threshold that has been previously defined or that has been determined by using a value having a value of a function using a bandwidth, etc. as a factor. In this case, the terminal processor 1620 may perform the channel access procedure for each direction (or beam)

The invention claimed is:

1. A method performed by a user equipment (UE) in a communication system, the method comprising:
    identifying multiple beams for a Type 1 channel access procedure;
    identifying, for each beam, a corresponding value N for the Type 1 channel access procedure, wherein N is an integer value between 0 and a value of contention window (CW); and
    performing the Type 1 channel access procedure on each beam independently based on the corresponding value N.

2. The method of claim 1, wherein the value of N is independently selected for each beam for the Type 1 channel access procedure.

3. The method of claim 1, wherein the multiple beams for the Type 1 channel access procedure are associated with multiple transmission beams.

4. A method performed by a base station (BS) in a communication system, the method comprising:
    identifying multiple beams for a Type 1 channel access procedure;
    identifying, for each beam, a corresponding value N for the Type 1 channel access procedure, wherein N is an integer value between 0 and a value of contention window (CW); and
    performing the Type 1 channel access procedure on each beam independently based on the corresponding value N.

5. The method of claim 4, wherein the value of N is independently selected for each beam for the Type 1 channel access procedure.

6. The method of claim 4, wherein the multiple beams for the Type 1 channel access procedure are associated with multiple transmission beams.

7. A user equipment (UE) in a communication system, the UE comprising:
    a transceiver; and
    at least one processor configured to:
        identify multiple beams for a Type 1 channel access procedure,
        identify, for each beam, a corresponding value N for the Type 1 channel access procedure, wherein N is an integer value between 0 and a value of contention window (CW), and
        perform the Type 1 channel access procedure on each beam independently based on the corresponding value N.

8. The UE of claim 7, wherein the value of N is independently selected for each beam for the Type 1 channel access procedure.

9. The UE of claim 7, wherein the multiple beams for the Type 1 channel access procedure are associated with multiple transmission beams.

10. A base station (BS) in a communication system, the BS comprising:
    a transceiver; and
    at least one processor configured to:
        identify multiple beams for a Type 1 channel access procedure,
        identify, for each beam, a corresponding value N for the Type 1 channel access procedure, wherein N is an integer value between 0 and a value of contention window (CW), and
        perform the Type 1 channel access procedure on each beam independently based on the corresponding value N.

11. The BS of claim 10, wherein the value of N is independently selected for each beam for the Type 1 channel access procedure.

12. The BS of claim 10, wherein the multiple beams for the Type 1 channel access procedure are associated with multiple transmission beams.

* * * * *